US008957919B2

(12) United States Patent
Han et al.

(10) Patent No.: US 8,957,919 B2
(45) Date of Patent: Feb. 17, 2015

(54) MOBILE TERMINAL AND METHOD FOR DISPLAYING IMAGE OF MOBILE TERMINAL

(75) Inventors: Baik Han, Seoul (KR); Namyong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 828 days.

(21) Appl. No.: 13/078,726

(22) Filed: Apr. 1, 2011

(65) Prior Publication Data

US 2011/0242103 A1 Oct. 6, 2011

(30) Foreign Application Priority Data

Apr. 5, 2010 (KR) .................. 10-2010-0030758
Aug. 18, 2010 (KR) .................. 10-2010-0079585

(51) Int. Cl.
*G09G 5/00* (2006.01)
*H04N 13/04* (2006.01)
*H04N 13/00* (2006.01)
*H04N 13/02* (2006.01)

(52) U.S. Cl.
CPC ....... *H04N 13/0404* (2013.01); *H04N 13/0022* (2013.01); *H04N 13/004* (2013.01); *H04N 13/0239* (2013.01); *H04N 13/0409* (2013.01); *H04N 13/0475* (2013.01); *H04N 13/0497* (2013.01); *H04N 13/007* (2013.01); *H04N 13/0452* (2013.01)

USPC .......................................... 345/659; 345/419

(58) Field of Classification Search
CPC ...................... H04N 13/0409; H04N 13/0022
USPC .................................... 345/419, 659
See application file for complete search history.

(56) References Cited

U.S. PATENT DOCUMENTS

| | | | |
|---|---|---|---|
| 2005/0062715 A1* | 3/2005 | Tsuji et al. | 345/158 |
| 2005/0270396 A1* | 12/2005 | Miyashita et al. | 348/333.01 |
| 2007/0191070 A1* | 8/2007 | Rao | 455/566 |
| 2007/0200927 A1* | 8/2007 | Krenik | 348/47 |
| 2007/0279412 A1* | 12/2007 | Davidson et al. | 345/419 |
| 2008/0231767 A1* | 9/2008 | Lee | 349/15 |
| 2009/0222127 A1* | 9/2009 | Lind | 700/132 |
| 2010/0295958 A1* | 11/2010 | Larsson et al. | 348/222.1 |
| 2011/0107216 A1* | 5/2011 | Bi | 715/716 |

* cited by examiner

*Primary Examiner* — Maurice L McDowell, Jr.
*Assistant Examiner* — Kyle Zhai
(74) *Attorney, Agent, or Firm* — Birch, Stewart, Kolasch & Birch, LLP

(57) ABSTRACT

A mobile terminal and a method for displaying an image of the mobile terminal are disclosed. An optimum stereoscopic image is provided to a user and virtual information or a graphic object having the same depth as that of a particular object included in the stereoscopic image is displayed to correspond to the particular object, thereby informing the user that the virtual information or the graphic object is information regarding the particular object.

13 Claims, 33 Drawing Sheets

MOBILE TERMINAL AND METHOD FOR DISPLAYING IMAGE OF MOBILE TERMINAL

BACKGROUND OF THE INVENTION

1. Field of the Invention

The present invention relates to a stereoscopic image and, more particularly, to a mobile terminal adaptive for providing a stereoscopic image to a user and a method for displaying an image of the mobile terminal.

2. Description of the Related Art

Recently, movements for providing stereoscopic images through electronic devices including a mobile terminal have been active. To this end, improvements of hardware and/or software of mobile terminals are taken into consideration.

SUMMARY OF THE INVENTION

An aspect of the present invention provides a mobile terminal capable of providing a stereoscopic image to a user, and a method for displaying an image of a mobile terminal.

Another aspect of the present invention provides a mobile terminal capable of allowing the user to enjoy a stereoscopic image in an optimum environment through a transparent display, and a method for displaying an image of a mobile terminal.

Another aspect of the present invention provides a mobile terminal capable of providing information regarding various objects included in a stereoscopic image such that the information has the same depth sense as that of a corresponding object, and a method for displaying an image of a mobile terminal.

Another aspect of the present invention provides a mobile terminal capable of allowing virtual information corresponding to an entity to be viewed as if the virtual information exists at the same distance as that of the entity.

According to a first aspect of the present invention, there is provided a mobile terminal including: a transparent display having a panel for implementing a stereoscopic vision on at least one of both surfaces thereof; a sensing unit configured to sense a surface that faces a user, among the both surfaces; and a controller configured to reverse horizontally or vertically an image being displayed on the transparent display when a change in the surface facing the user is detected, wherein the panel has a structure for implementing a stereoscopic vision according to any one of a lenticular lens scheme and a parallax barrier scheme, and when the panel is provided on the detected surface facing the user, the controller is configured to output the image as a stereoscopic image, and when the panel is not provided on the detected surface facing the user, the controller is configured to output the image as a 2D (two-dimensional) image.

According to a second aspect of the present invention, there is provided a method for displaying an image of a mobile terminal, including: displaying an image on a transparent display having a panel for implementing a stereoscopic vision on at least one of both surfaces thereof; detecting a change in the surface that faces a user among the both surfaces; and reversing the displayed image horizontally or vertically according to the detected change, wherein when the panel is provided on the surface facing the user, the image is output as a stereoscopic image, and when the panel is not provided on the surface facing the user, the image is output as a 2D (two-dimensional) image.

According to a third aspect of the present invention, there is provided a mobile terminal including: a display unit having a panel for implementing a stereoscopic vision; and a controller configured to display a stereoscopic image using stereo disparity on the display unit, and to display a graphic object corresponding to a particular object included in the stereoscopic image such that the stereo disparity of the particular object and that of the graphic object are equal.

According to a fourth aspect of the present invention, there is provided a mobile terminal including: a camera; a display unit having a panel for implementing a stereoscopic vision; and a controller configured to display an image obtained by the camera on the display unit and to display a graphic object having a stereo disparity proportionate to the distance between the mobile terminal and a particular object such that the graphic object corresponds to a particular object included in the image when the particular object is selected.

According to a fifth aspect of the present invention, there is provided a method for displaying an image on a mobile terminal including a display unit having a panel for implementing a stereoscopic vision, including: displaying a stereoscopic image using a stereo disparity on the display unit; generating a graphic object having the same stereo disparity as that of a particular object; and displaying the generated graphic object such that the graphic object corresponds to the particular object.

According to a sixth aspect of the present invention, there is provided a method for displaying an image on a mobile terminal including a display unit having a panel for implementing a stereoscopic vision, including: displaying an image obtained by a camera on the display unit; receiving a select signal with respect to a particular object included in the image; and displaying a graphic object having a stereo disparity proportionate to the distance between the mobile terminal and the particular object such that the graphic object corresponds to the particular object.

The mobile terminal and the method for displaying an image of the mobile terminal according to exemplary embodiments of the present invention have the following advantages.

That is, a stereoscopic image can be provided to a user, and in particular, a stereoscopic image can be provided to the user in an optimum environment through a transparent display.

In addition, an optimum stereoscopic image is provided to a user and virtual information or a graphic object having the same depth as that of a particular object included in the stereoscopic image is displayed to correspond to the particular object, thereby informing the user that the virtual information or the graphic object is information regarding the particular object.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
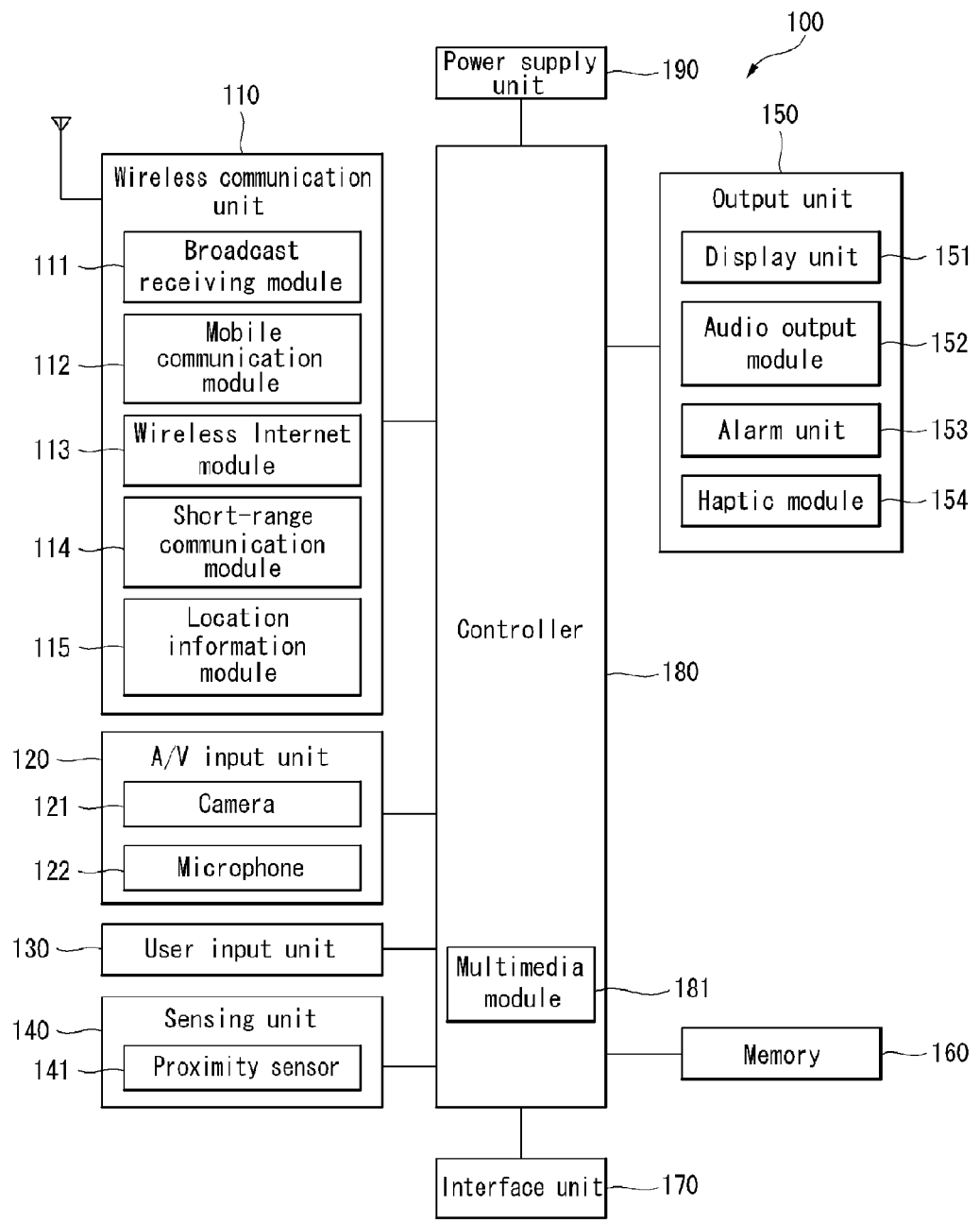
FIG. 1 is a block diagram of a mobile terminal according to an exemplary embodiment of the present invention.

The foregoing and other objects, features, aspects and advantages of the present invention will become more apparent from the following detailed description of the present invention when taken in conjunction with the accompanying drawings. Exemplary embodiments of the present invention will now be described in detail with reference to the accompanying drawings. The same reference numerals will be used throughout to designate the same or like components. In describing the present invention, if a detailed explanation for a related known function or construction is considered to unnecessarily divert the gist of the present invention, such explanation will be omitted but would be understood by those skilled in the art.

A mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, computers, notebook computers, digital broadcasting terminals, PDAs (Personal Digital Assistants), PMPs (Portable Multimedia Player), navigation devices, and the like.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. Of course, the broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal.

The location information module 115 is a module for checking or acquiring a location of the mobile terminal. The location information module 115 may acquire location information by using a global navigation satellite system (GNSS). Here, the GNSS is the standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLONASS), COMPASS, a compass navigation system, by the People's Republic of China, and the quasi-zenith satellite system (QZSS) by Japan.

A typical example of GNSS is a GPS (Global Positioning System) module. The GPS module 115 may calculate information regarding the distance from one point (entity) to three or more satellites and information regarding time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module 115 may continuously calculate the current location in real time and also calculate speed information by using the continuously calculated current location.

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile terminal.

The microphone 122 may receive sounds via a microphone in a phone call mode, a recording mode, a voice recognition mode, and the like, and can process such sounds into audio data. The processed audio data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

The sensing unit 140 detects a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow for viewing of the exterior, which may be called transparent displays. A typical transparent display may be, for example, a TOLED (Transparent Organic Light Emitting Diode) display, or the like. A rear structure of the display unit 151 may be also light-transmissive. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor may be disposed within or near the touch screen. The proximity sensor is a sensor for detecting the presence or absence of an object relative to a certain detection surface or an object that exists nearby by using the force of electromagnetism or infrared rays without a physical contact. Thus, the proximity sensor has a considerably longer life span compared with a contact type sensor, and it can be utilized for various purposes.

Examples of the proximity sensor may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like.

In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or the like. In addition, the audio output module 152 may output a sound through an earphone jack 116.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. The video signal or the audio signal may be also outputted through the display unit 151 or the audio output module 152.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the mobile terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2:
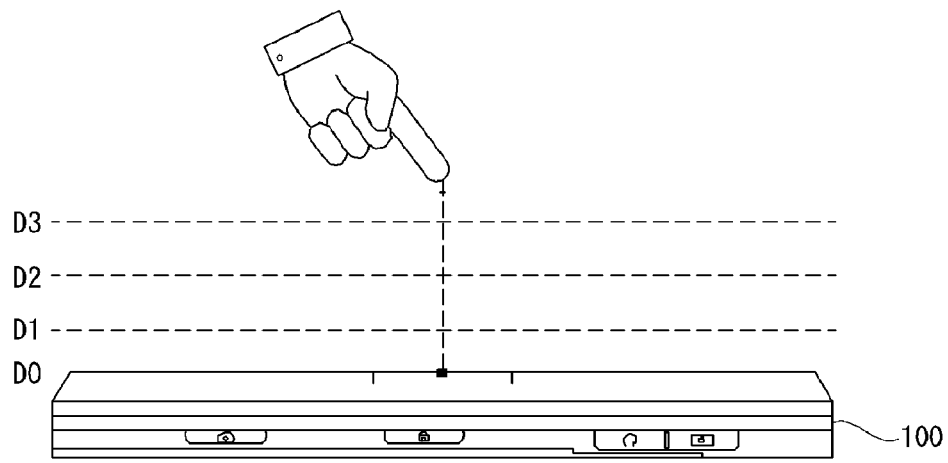
FIG. 2 is a conceptual view for explaining the depth of proximity of the proximity sensor.

FIG. 2 is a conceptual view for explaining the depth of proximity of the proximity sensor.

As shown in FIG. 2, when a pointer such as the user's finger, a pen, or the like, approaches the touch screen, the proximity sensor disposed within or near the touch screen detects it and outputs a proximity signal.

The proximity sensor may be configured to output a different proximity signal according to the distance (referred to as a 'proximity depth', hereinafter) between the closely touched pointer and the touch screen.

FIG. 2 shows the section of the touch screen with the proximity sensor for detecting, for example, three proximity depths. The proximity sensor may detect three or less or four or more proximity depths.

In detail, when the pointer is fully brought into contact with the touch screen d0, it is recognized as a contact touch. When the pointer is positioned to be spaced apart by shorter than a distance d1 on the touch screen, it is recognized as a proximity touch with a first proximity depth.

If the pointer is positioned to be spaced apart by the distance longer than the distance d1 but shorter than a distance d2 on the touch screen, it is recognized as a proximity touch with a second proximity depth. If the pointer is positioned to be spaced apart by the distance longer than the distance d2 but shorter than a distance d3, it is recognized as a proximity touch with a third proximity depth. If the pointer is positioned to be spaced apart by longer than the distance d3 on the touch screen, it is recognized that the proximity touch has been released.

Accordingly, the controller 180 may recognize the proximity touches as various input signals according to the proximity depths and proximity positions of the pointer, and may control various operations according to the various input signals.

Figure 3:
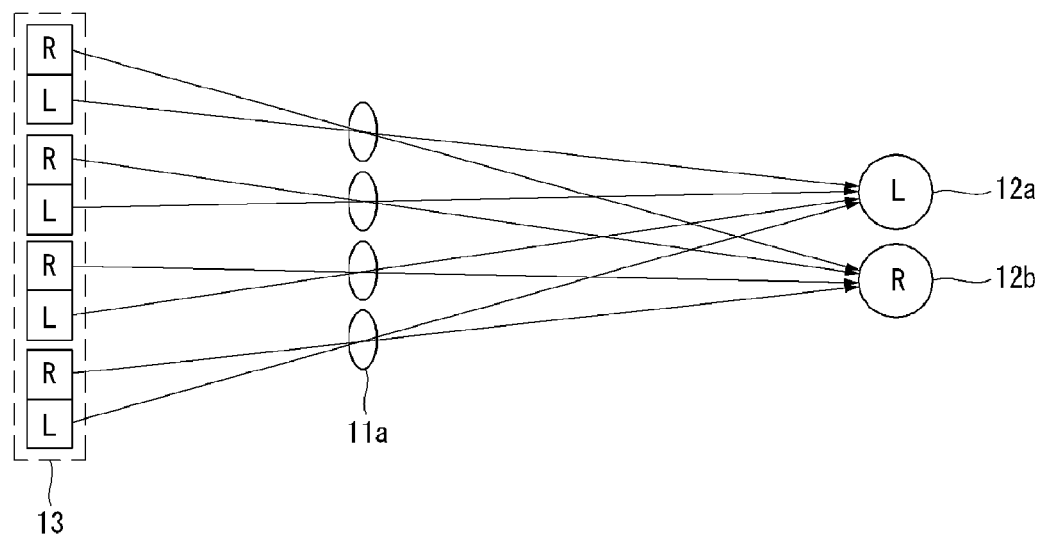
FIGS. 3 and 4 are views for explaining a method for displaying a stereoscopic image by using a binocular parallax according to an exemplary embodiment of the present invention.
Figure 4:
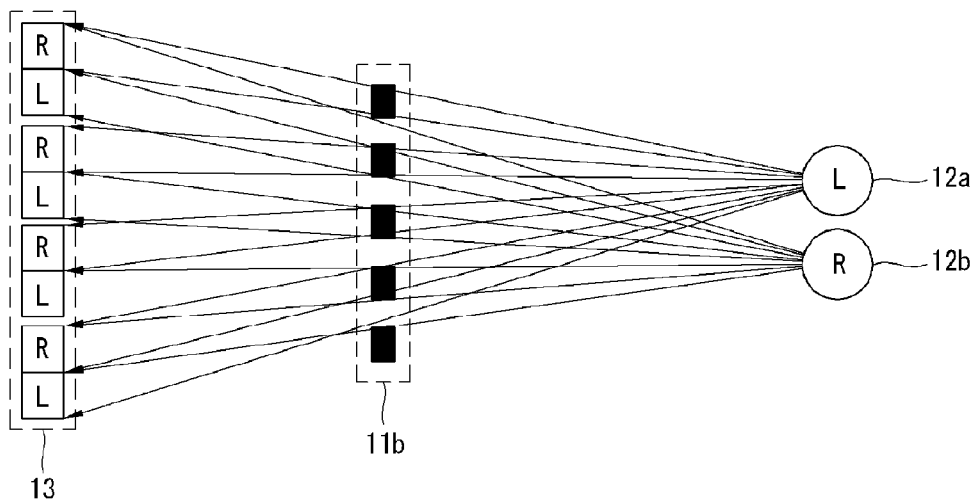

FIGS. 3 and 4 are views illustrating a method for displaying a stereoscopic image using binocular parallax according to an exemplary embodiment of the present invention. Specifically, FIG. 3 shows a scheme using a lenticular lens array, and FIG. 4 shows a scheme using a parallax barrier.

Binocular parallax (or stereo disparity) refers to the difference in vision of viewing an object between a human being's (user's or observer's) left and right eyes. When the user's brain combines an image viewed by the left eye and that viewed by the right eye, the combined image makes the user feel stereoscopic. Hereinafter, the phenomenon in which the user feels stereoscopic according to binocular parallax will be referred to as a 'stereoscopic vision', and an image causing a stereoscopic vision will be referred to as a 'stereoscopic image'. Also, when a particular object included in an image causes the stereoscopic vision, the corresponding object will be referred to as a 'stereoscopic object'.

A method for displaying a stereoscopic image according to binocular parallax is classified into a glass type method and a glassless type method. The glass type method may include a scheme using tinted glasses having a wavelength selectivity, a polarization glass scheme using a light blocking effect according to a deviation difference, and a time-division glass scheme alternately providing left and right images within a residual image time of eyes. Besides, the glass type method may further include a scheme in which filters each having a different transmittance are mounted on left and right eyes and a cubic effect with respect to a horizontal movement is obtained according to a time difference of a visual system made from the difference in transmittance.

The glassless type method, in which a cubic effect is generated from an image display surface, rather than from an observer, includes a parallax barrier scheme, a lenticular lens scheme, a microlens array scheme, and the like.

With reference to FIG. 3, in order to display a stereoscopic image, a display module 151 includes a lenticular lens array 81a. The lenticular lens array 81a is positioned between a display surface 81 on which pixels (L) to be input to a left eye 82a and pixels (R) to be input to a right eye 82b are alternately arranged along a horizontal direction, and the left and right eyes 82a and 82b, and provides an optical discrimination directionality with respect to the pixels (L) to be input to the left eye 82a and the pixels (R) to be input to the right eye 82b. Accordingly, an image which passes through the lenticular lens array 81a is separated by the left eye 82a and the right eye 82b and thusly observed, and the user's brain combines (or synthesizes) the image viewed by the left eye 82a and the image viewed by the right eye 82b, thus allowing the user to observe a stereoscopic image.

With reference to FIG. 4, in order to display a stereoscopic image, the display module 151 includes a parallax barrier 81b in the shape of a vertical lattice. The parallax barrier 81b is positioned between a display surface 81 on which pixels (L) to be input to a left eye 82a and pixels (R) to be input to a right eye 82b are alternately arranged along a horizontal direction, and the left and right eyes 82a and 82b, and allows images are separately observed at the left eye 82a and the right eye 82b. Accordingly, the user's brain combines (or synthesizes) the image viewed by the left eye 82a and the image viewed by the right eye 82b, thus allowing the user to observe a stereoscopic image. The parallax barrier 81b is turned on to separate incident vision only in the case of displaying a stereoscopic image, and when a planar image is intended to be displayed, the parallax barrier 81*b* may be turned off to allow the incident vision to pass therethrough without being separated.

Meanwhile, the foregoing methods for displaying a stereoscopic image are merely for explaining exemplary embodiments of the present invention, and the present invention is not meant to be limited thereto. Beside the foregoing methods, a stereoscopic image using binocular parallax may be displayed by using various other methods.

FIGS. 5 to 10 are views for explaining an external appearance of a mobile terminal according to an exemplary embodiment of the present invention.

Figure 5:
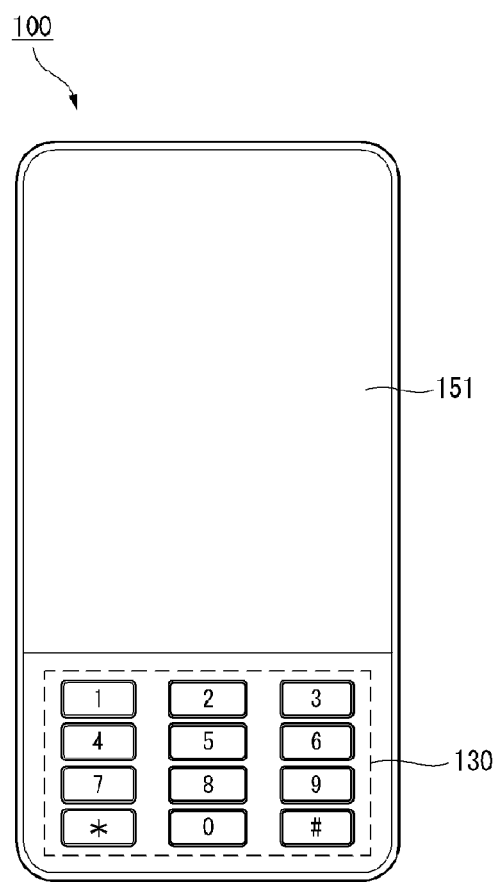
FIGS. 5 to 10 are views for explaining an external appearance of a mobile terminal according to an exemplary embodiment of the present invention.
Figure 6:
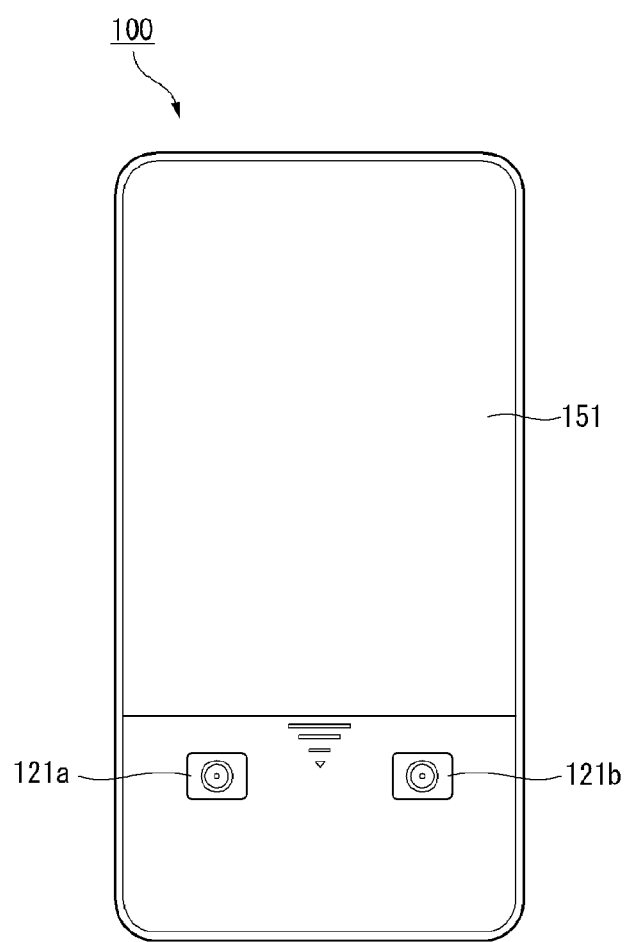

FIGS. 5 and 6 illustrate an external appearance of a bar type mobile terminal according to an exemplary embodiment of the present invention.

With reference to FIG. 5, the bar type mobile terminal 100 is configured as a one body. A display unit 151 is provided at an upper portion of a front surface of the mobile terminal 100. The display unit 151 may be configured as a transparent display as described above. A user input unit 130 such as a keypad is provided at a lower portion of the front surface of the mobile terminal 100 as shown in FIG. 5, and a circuit for implementing the controller 180 is provided therein.

Namely, the area in which the transparent display 151 is positioned and the circuit for implementing the controller unit 180 may be physically demarcated.

FIG. 6 illustrates an example of a rear surface of the bar type mobile terminal 100 illustrated in FIG. 5. As shown in FIG. 5, a plurality of cameras 121*a* and 121*b* may be provided on the rear surface of the bar type mobile terminal 100.

Figure 7:
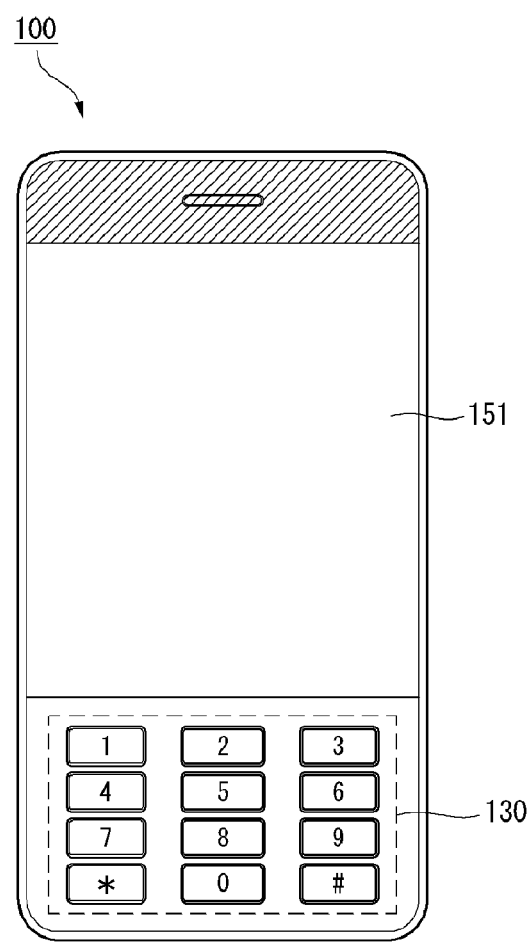
Figure 8A:
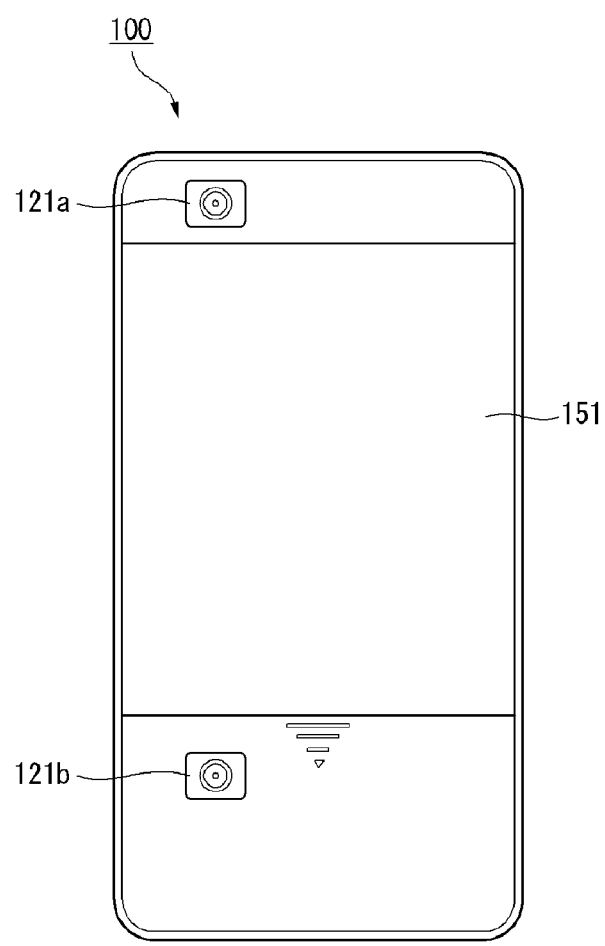
Figure 8B:
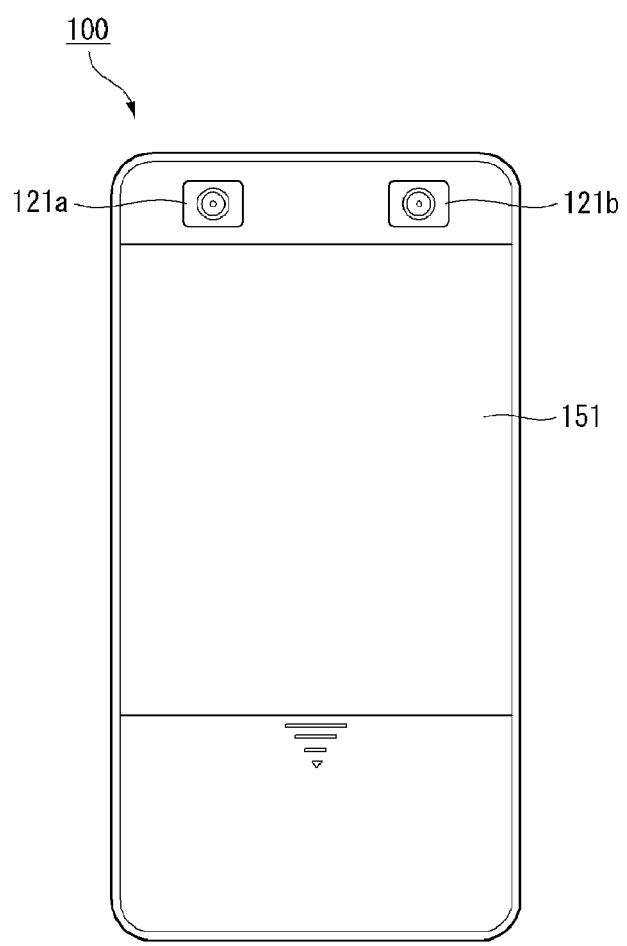

FIGS. 7, 8*a*, and 8*b* illustrate an external appearance of the bar type mobile terminal according to another exemplary embodiment of the present invention.

With reference to FIG. 7, the front surface of the bar type mobile terminal has the same form as that of the mobile terminal illustrated in FIG. 6, except that the position of the transparent display 151 provided to the mobile terminal 100 is slightly different from that of the mobile terminal illustrated in FIG. 6.

FIGS. 8*a* and 8*b* illustrate examples of the rear surface of the bar type mobile terminal 100 illustrated in FIG. 7. In FIGS. 8*a* and 8*b*, the plurality of cameras 121*a* and 121*b* are disposed at different positions.

Figure 9:
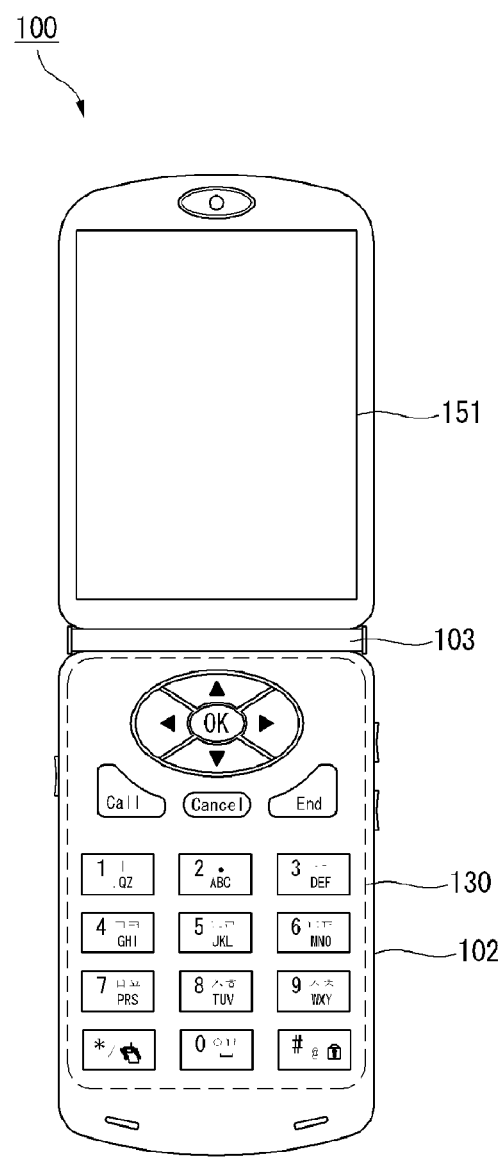
Figure 10:
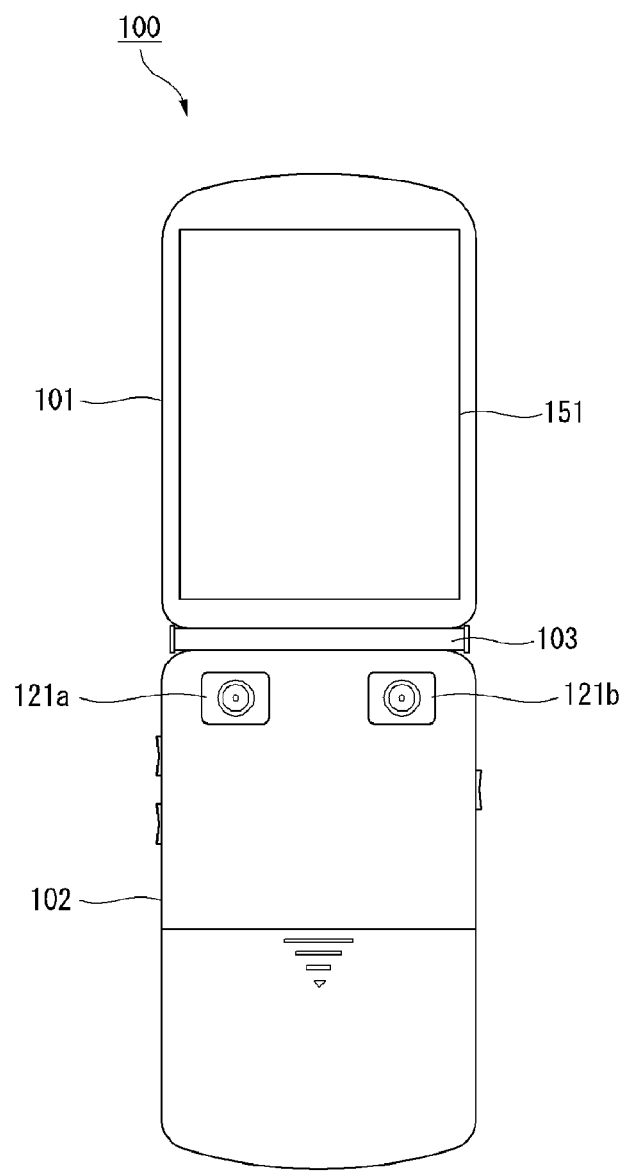

FIGS. 9 and 10 illustrate an external appearance of a folder type mobile terminal according to an exemplary embodiment of the present invention. In FIGS. 9 and 10, the folder type mobile terminal is in an open configuration, showing a front surface and a rear surface thereof.

With reference to FIG. 9, the folder type mobile terminal 100 may include a first body 101 and a second body 102 connected by a coupling unit 103 such that they can be mutually foldable.

The first body 101 may be configured to include the transparent display 151, and the second body 102 may be disposed on a front surface of the user input unit 130 and include a circuit for implementing the controller 180, or the like, therein.

FIG. 10 illustrates a rear surface of the folder type mobile terminal 100 illustrated in FIG. 9. With reference to FIG. 10, a plurality of cameras 121*a* and 121*b* may be provided on the rear surface of the folder type mobile terminal 100. The positions of the plurality of cameras 121*a* and 121*b* illustrated in FIG. 10 may be changed. For example, among the plurality of cameras, the first camera 121*a* may be disposed on the rear surface of the first body 101, and the second camera 121*b* may be disposed on the rear surface of the second body 102.

Exemplary embodiments of the present invention will now be described.

In some of exemplary embodiments disclosed in this document, the mobile terminal 100 includes a transparent display 151, and at least one of both surfaces of the transparent display 151 may include a panel for implementing a stereoscopic vision. The panel has a structure for implementing a stereoscopic vision according to any one of a lenticular lens scheme and a parallax barrier scheme.

Figure 11:
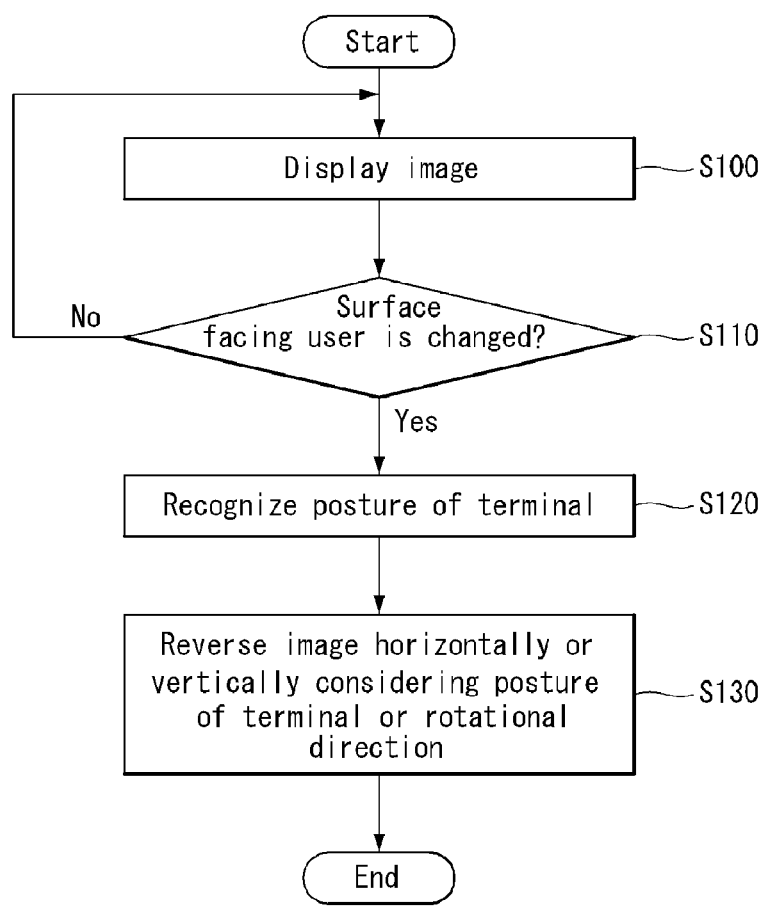
FIG. 11 is a flow chart illustrating the process of a method for displaying an image of a mobile terminal according to a first exemplary embodiment of the present invention.
Figure 12:
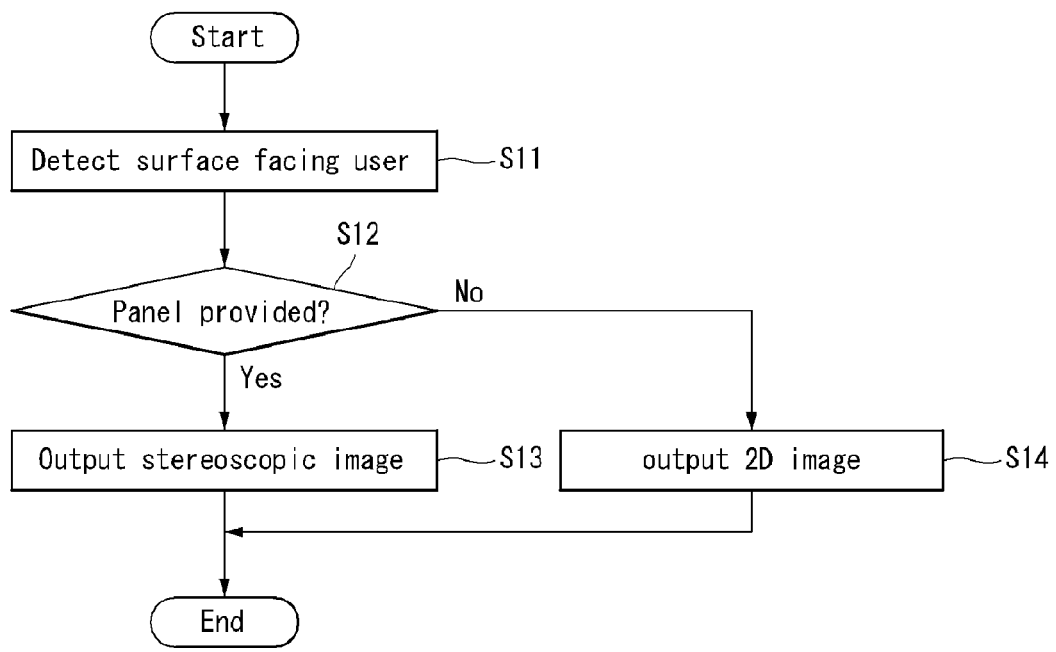
FIG. 12 is a detailed flow chart of steps S100 to S130 in FIG. 11.

FIG. 11 is a flow chart illustrating the process of a method for displaying an image of a mobile terminal according to a first exemplary embodiment of the present invention. FIG. 12 is a detailed flow chart of steps S100 to S130 in FIG. 11. FIGS. 13 to 17 are overviews of display screens illustrating a method for displaying an image of a mobile terminal according to the first exemplary embodiment of the present invention.

The method for displaying an image of a mobile terminal according to a first exemplary embodiment of the present invention and the mobile terminal 100 for implementing the same will now be described in detail with reference to the accompanying drawings.

With reference to FIG. 11, the controller 180 may display an image on the transparent display 151 (S100).

The image may be output as any one of a stereoscopic image and a 2D image according to whether or not the transparent display 151 has the panel for implementing a stereoscopic vision on a surface facing the user.

The detailed process (S11 to S14) for implementing the step 100 will now be described with reference to the FIG. 12. The process illustrated in FIG. 12 can be also applied to implementation of the step 130 described below.

For example, with reference to FIG. 12, the controller 180 may detect the surface, among both surfaces of the transparent display 151, that faces the user through the sensing unit 140 (S11).

The sensing unit 140 may include at least one of an acceleration sensor, an optical sensor, a temperature sensor, and a touch sensor.

For example, the sensing unit 140 may detect the posture (or the position) of the mobile terminal or a change in the posture of the mobile terminal, such as a rotation of the mobile terminal or a change in the surface facing the user by using the acceleration sensor.

Also, for example, the sensing unit 140 may recognize light and shade of a portion grasped by the user's hand by using the optical sensor, thus detecting the surface facing the user and the change. This is based on the principle that the difference in light and shade occurs when the portion having the optical sensor is covered by the user's hand.

Also, for example, the sensing unit 140 may detect the temperature of the portion grasped by the user's hand by using the temperature sensor, thus detecting the surface facing the user and the change. This is based on the principle that the difference in temperature occurs according to the body temperature generated from the user's hand.

Also, for example, the sensing unit 140 may detect the area of the portion grasped by the user's hand by using the touch sensor, thus detecting the surface facing the user and the change.

Also, the controller 180 may detect the surface facing the user and the change by using the camera 121. In this case, the camera 121 may perform even the function of the sensing unit 140.

For example, when the camera 121 is provided to both sides of the mobile terminal 100, the direction in which the user's face is recognized may be recognized as the surface facing the user by using a face recognition algorithm.

Also, for example, when the camera 121 is provided to only one of the surfaces of the mobile terminal 100 and the user's face is recognized through the camera 121, the surface of the mobile terminal 100 on which the camera 121 is provided is the surface facing the user, and when the user's face is not recognized through the camera 121, the opposite side of the surface on which the camera 121 is provided is the surface facing the user.

Meanwhile, as discussed above, the stereoscopic image may be generated by synthesizing a left eye image and a right eye image.

The stereoscopic image may be received from an external source or generated by the mobile terminal 100.

For example, when the mobile terminal 100 includes the plurality of cameras 121a and 121b as described above, the controller 180 may synthesize the left eye image and the right eye image obtained through the plurality of cameras 121a and 121b to generate the stereoscopic image.

Here, the plurality of cameras 121a and 121b may sequentially or simultaneously obtain images, and the controller 180 may synthesizes them to generate the stereoscopic image.

Also, for example, the controller 180 may convert a two-dimensional (2D) image into the stereoscopic image by using a certain image conversion algorithm, thus generating the stereoscopic image.

In this document, the stereoscopic image is a concept including a still image and a video.

The controller 180 determines whether or not the surface facing the user includes the panel for implementing a stereoscopic vision detected in step S11 (S12). When the surface facing the user includes the panel, the controller 180 may output the image as a stereoscopic image (S13), and when the surface facing the user does not include a panel, the controller 180 may output the image as a 2D image (S14).

The panel for implementing the stereoscopic vision may be provided on at least one of both surfaces of the transparent display 151. Namely, the panel may be provided to only one of the both surfaces of the transparent display 151, or may be provided to both surface of the transparent display 151. The user can view the stereoscopic image through the surface having the panel.

The controller 180 may determine whether or not the surface facing the user has been changed through the sensing unit (S110).

When the surface facing the user has been changed, the controller 180 recognizes the posture or the rotational direction of the mobile terminal 100 (S120) and horizontally or vertically reverses the image displayed in step S100 considering the recognized posture (S130).

The change of the surface facing the user is accompanied with the rotation of the mobile terminal 100 in a specific direction. The specific direction can include horizontal direction and vertical direction.

The controller 180 can determine direction of reversing the image considering the recognized posture or the rotational direction of the mobile terminal 100 after the surface facing the user is changed.

For example, when the change of the surface facing the user occurs by rotation of the mobile terminal 100 in horizontal direction, the controller 180 horizontally reverses the image displayed.

And also, for example, when the change of the surface facing the user occurs by rotation of the mobile terminal 100 in vertical direction, the controller 180 vertically reverses the image displayed.

The examples of implementing steps S110 to S130 will now be described with reference to FIGS. 13 to 15.

Figure 13:
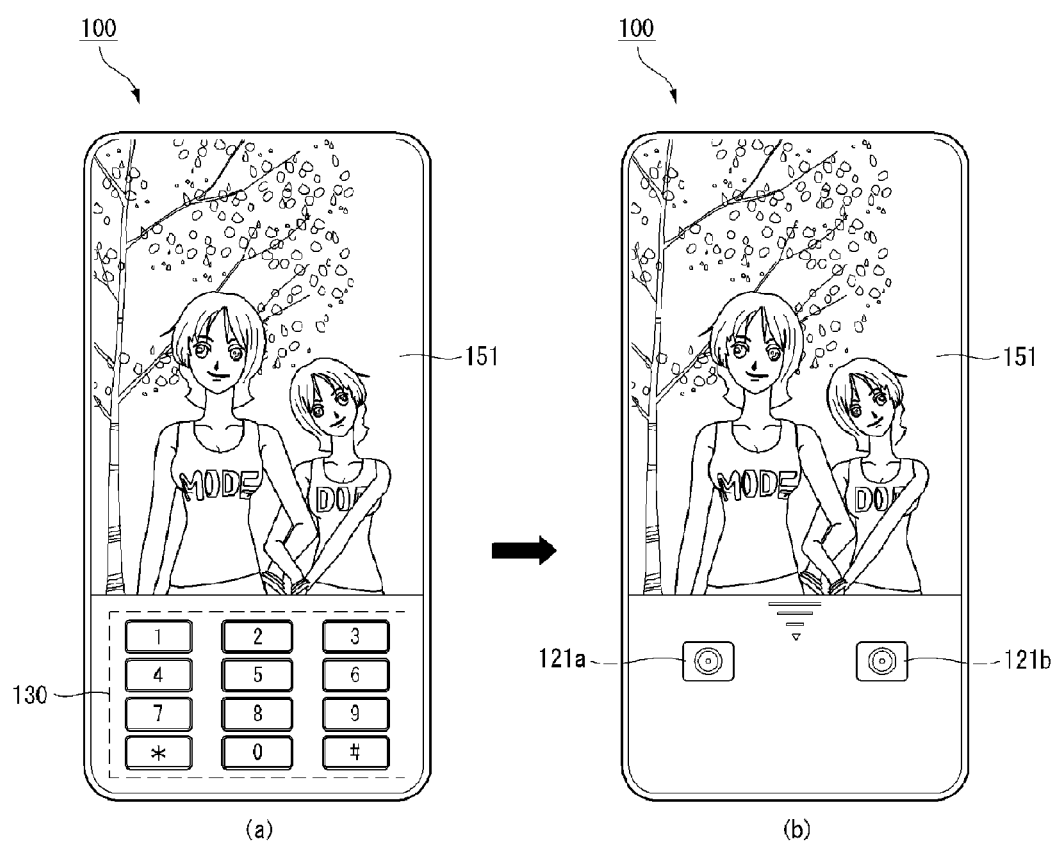
FIGS. 13 to 17 are overviews of display screens illustrating a method for displaying an image of a mobile terminal according to the first exemplary embodiment of the present invention.

With reference to FIG. 13, when the user reverses the mobile terminal 100 (See FIG. 13(b)) while viewing an image through the front surface of the mobile terminal 100 (See FIG. 13(a)), the controller 180 determines that the surface facing the user has been changed and recognizes the posture of the mobile terminal 100.

Here, when the postures of FIGS. 13(a) and 13(b) are compared, the lower position of the mobile terminal 100 has not been changed but the same posture is maintained. This may be explained such that a certain reference area (e.g., an upper or lower reference area) or a reference point of the mobile terminal 100 has not been changed.

Also, it may be explained by a rotational direction of the mobile terminal 100. For example, the mobile terminal 100 illustrated in FIG. 13(b) is a state in which the mobile terminal 100 in the state of FIG. 13(a) has been rotated by 180 degrees in a horizontal direction (i.e., in a leftward direction or in a rightward direction).

As shown in FIG. 13(b), when there is no change in the posture of the mobile terminal 100 or when the mobile terminal 100 is rotated in the horizontal direction so the surface facing the user has been changed, the controller 180 horizontally reverses the image displayed in step S100.

Figure 14:
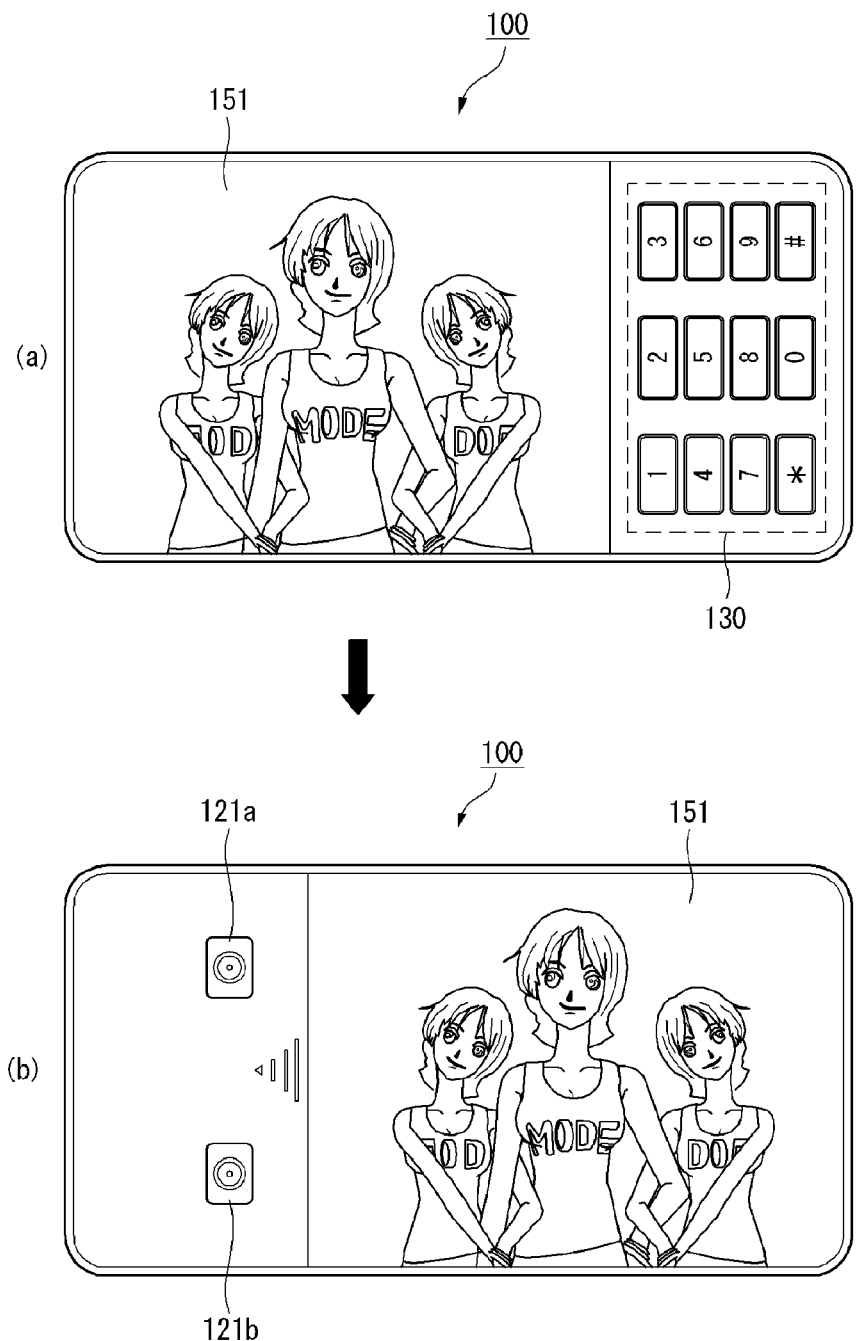
Figure 15:
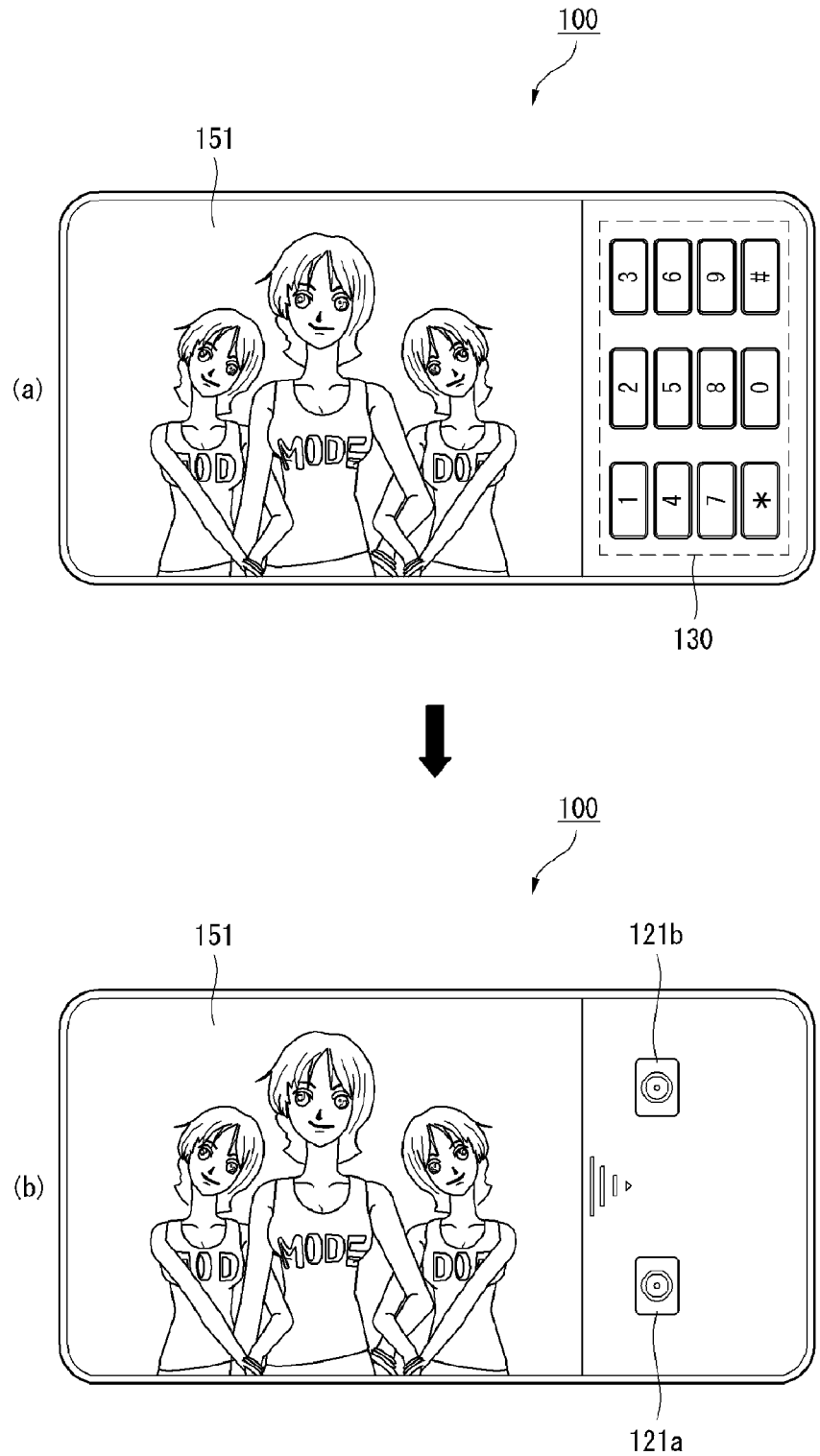
Figure 16:
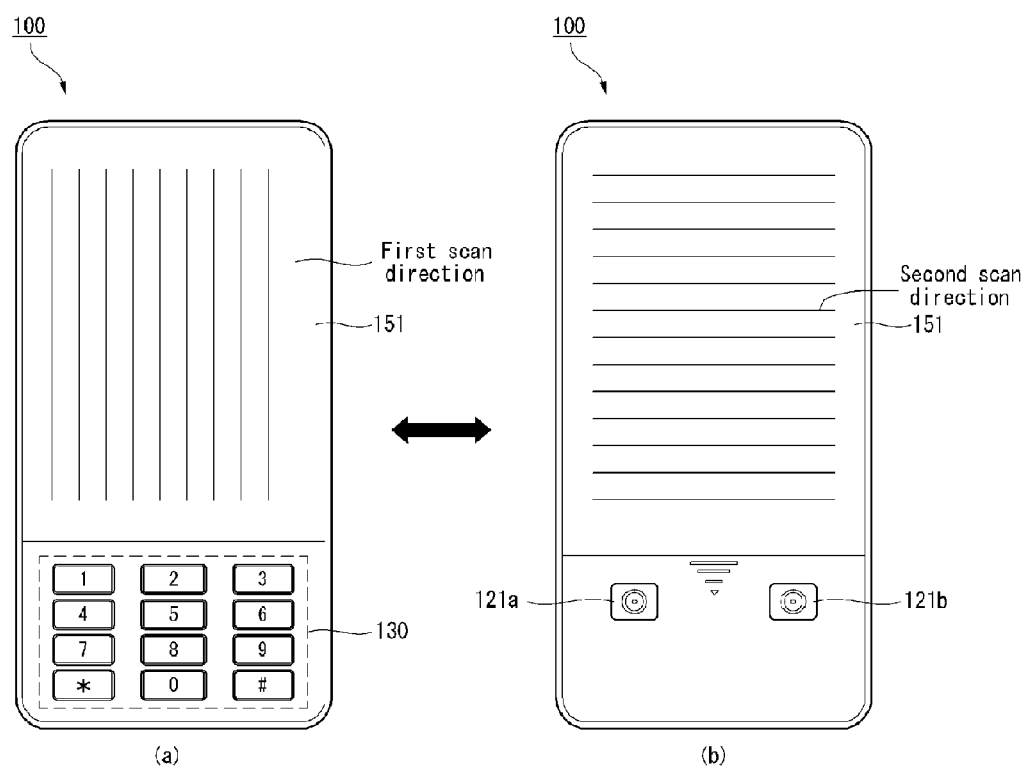

With reference to FIG. 14, likewise as in the example illustrated in FIG. 13, when the user rotates the mobile terminal by 180 degrees in the horizontal direction (See FIG. 14(b)) while viewing the image with the mobile terminal 100 positioned in the horizontal direction (See FIG. 14(a)), the controller 180 may vertically reverse the image being displayed in the state of FIG. 15(a) to display the image as shown in FIG. 15(b).

As discussed above with reference to FIGS. 13 to 15, when the surface facing the user is changed, the controller 180 horizontally or vertically reverses the image displayed on the transparent display 151 in consideration of the posture of the mobile terminal 100, thus providing the same image to the user regardless of the rotation or the change in the posture of the mobile terminal 100.

Meanwhile, in performing step S130 by the controller 180, the process illustrated in FIG. 12 may be applied in the same manner.

For example, when the surface facing the user is changed as the user rotates the mobile terminal 180 by 180 degrees, any one of a stereoscopic image and a 2D image may be output according to whether or not a panel for implementing a stereoscopic vision is provided on the surface that currently faces the user.

Meanwhile, according to an exemplary embodiment of the present invention, the panel for implementing a stereoscopic vision may be provided to both surfaces of the mobile terminal 100. In this case, the panel provided on one (e.g., the front surface) of the both surfaces may have a structure for implementing a stereoscopic vision in a vertical direction (See a first scan direction illustrated in FIG. 16(a)) and the panel provided on the other surface (e.g., the rear surface) may have a structure for implementing a stereoscopic vision in a vertical direction (See a second scan direction illustrated in FIG. 16(b)).

Figure 17:
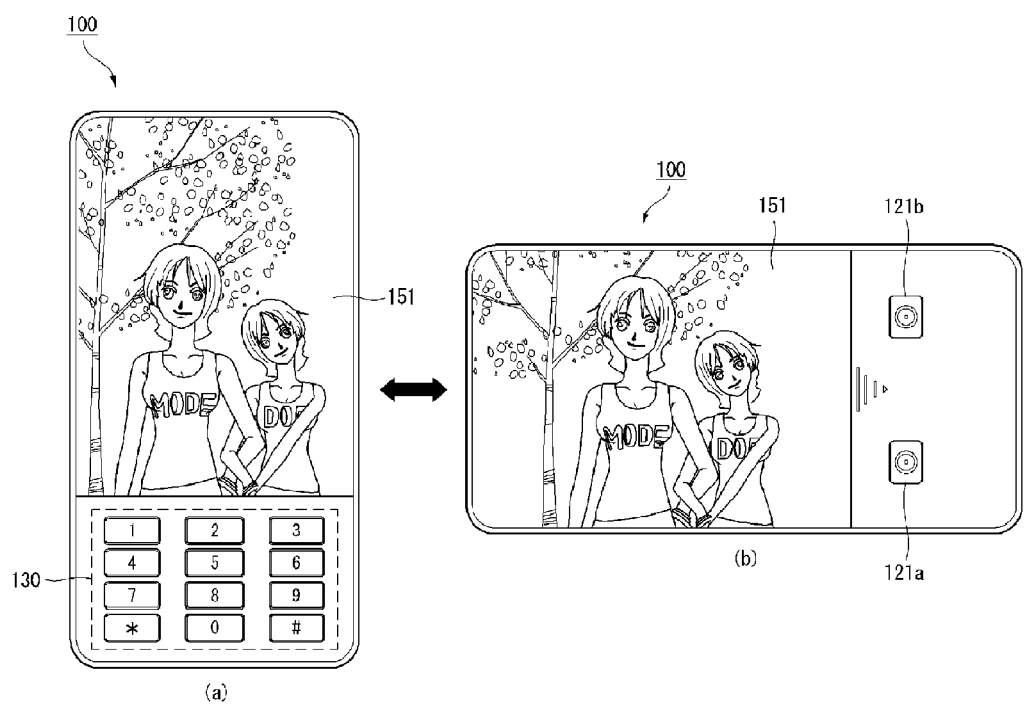

FIG. 17 illustrates an example of the posture of the mobile terminal 100 allowing the user to view a stereoscopic image with respect to both surfaces when the panel is provided on both surfaces of the mobile terminal 100 and scan directions of the panels are perpendicular.

For example, when the user can view a stereoscopic image through the transparent display 151 in the state of FIG. 17(a), the mobile terminal 100 needs to be positioned in the horizontal direction in the state of FIG. 17(b) in which the mobile terminal 100 has been rotated by 180 degrees, to allow the user to view the same stereoscopic image as that of FIG. 17(*a*).

Here, the controller 180 outputs the stereoscopic image such that it fits the structure of the panel provided to the surface facing the user among the panel structure implementing a stereoscopic vision in the vertical direction and the panel structure implementing a stereoscopic vision in the horizontal direction. Namely, the controller 180 may output different stereoscopic images according to the structure of the panel provided to the surface currently facing the user.

Of course, the panel provided on both surfaces of the mobile terminal 100 may have the structure for implementing a stereoscopic vision in the same direction.

Meanwhile, the panel according to the parallax barrier scheme may have a structure for implementing both the stereoscopic vision in the horizontal direction and the stereoscopic vision in the vertical direction.

When the panel according to the parallax barrier scheme capable of implementing both of the stereoscopic vision in the horizontal direction and the stereoscopic vision in the vertical direction is provided to the transparent display 100, the controller 180 may control the panel according to the parallax barrier scheme such that the stereoscopic vision in the horizontal direction and the stereoscopic vision in the vertical direction can be implemented.

The controller 180 may output the stereoscopic image such that it corresponds with the implementation of a stereoscopic vision in the vertical direction or a stereoscopic vision in the horizontal direction determined according to the posture of the mobile terminal.

The technique of outputting a stereoscopic image in both horizontal and vertical directions by switching a 3D liquid crystal barrier constituting the panel according to the parallax barrier scheme between the horizontal scan direction and the vertical scan direction is based on the invention disclosed in Korean Patent Registration No. 10-0647517 (Entitled Cell structure parallax-barrier and device for displaying stereoscopic image) and the invention disclosed in Korean Patent Registration No. 10-0935892 (Entitled Junction device for performing horizontal and vertical alignment of display panel for stereoscopic image).

Figure 18:
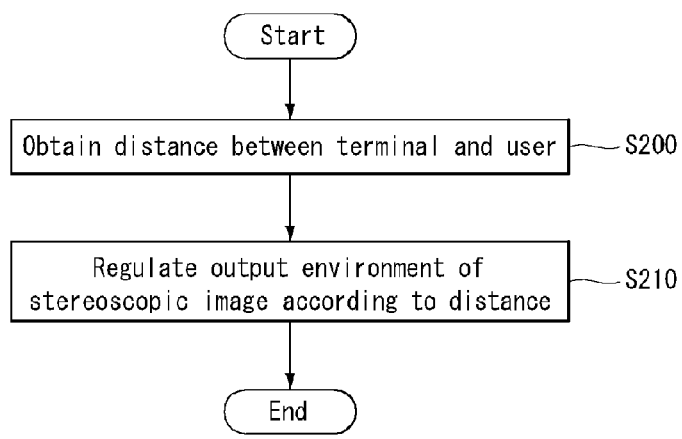
FIG. 18 is a flow chart illustrating the process of a method for displaying an image of a mobile terminal according to a second exemplary embodiment of the present invention.
Figure 19:
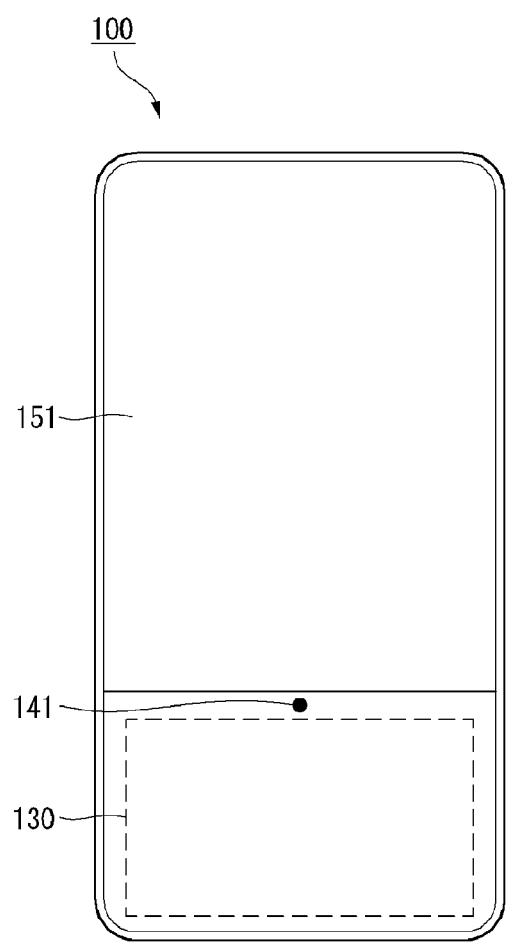
FIGS. 19 and 20 are views illustrating the method for displaying an image of a mobile terminal according to the second exemplary embodiment of the present invention.
Figure 20:
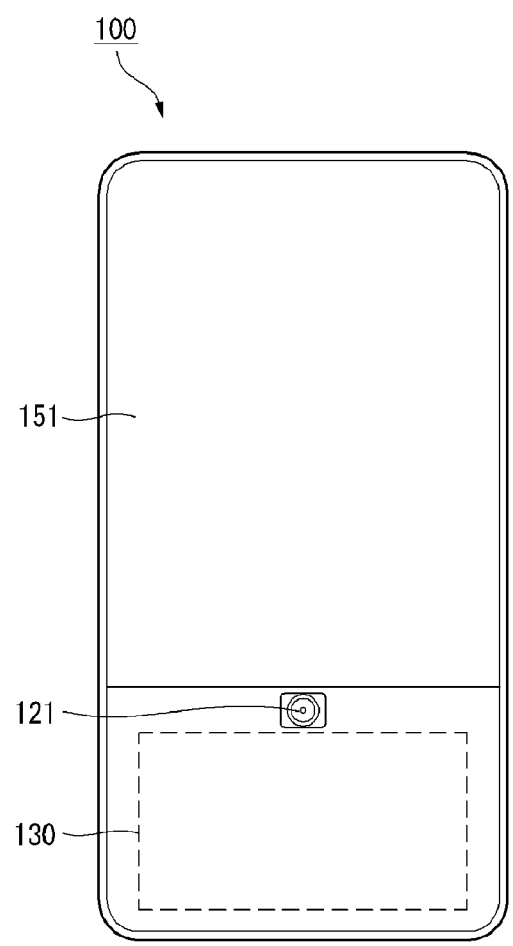

FIG. 18 is a flow chart illustrating the process of a method for displaying an image of a mobile terminal according to a second exemplary embodiment of the present invention, and FIGS. 19 and 20 are views illustrating the method for displaying an image of a mobile terminal according to the second exemplary embodiment of the present invention.

A method for displaying an image of a mobile terminal according to a second exemplary embodiment of the present invention and the mobile terminal 100 for implementing the same will now be described in detail with reference to the accompanying drawings.

With reference to FIG. 18, the controller 180 may obtain the distance between the mobile terminal 100 and the user (S200).

The controller 180 may obtain information regarding the distance between the mobile terminal 100 and the user in various manners.

FIG. 19 shows examples of the mobile terminal for obtaining the distance information according to different methods.

For example, the mobile terminal 100 illustrated in FIG. 19 includes a proximity sensor 141 on at least one of both surfaces of the mobile terminal 100. The controller 180 may obtain the distance information between the mobile terminal 100 and the user by using the proximity sensor 141.

Also, for example, the mobile terminal 100 illustrated in FIG. 20 may include the camera 121 on at least one of both surfaces of the mobile terminal 100. Here, the camera 121 provided on at least one of both surfaces of the mobile terminal 100 may be an auto-focus camera. The controller 180 may obtain the distance information between the mobile terminal 100 and the user by using the auto-focus camera.

The controller 180 may regulate an output environment of a stereoscopic image according to the distance obtained in step S200 (S210).

For example, the controller 180 may process a left eye image and a right eye image for implementing the stereoscopic image according to the distance information obtained in step S200 so that the user can enjoy an optimum stereoscopic image.

Also, for example, when the panel for implementing a stereoscopic vision has a structure according to the parallax barrier scheme, the controller 180 may adjust the width of the barrier according to the distance information obtained in step S200 so that that the user can view an optimum stereoscopic image.

Meanwhile, as discussed above, when the mobile terminal 100 has a plurality of cameras 121, only one of the plurality of cameras may be activated to obtain a 2D image.

Figure 21:
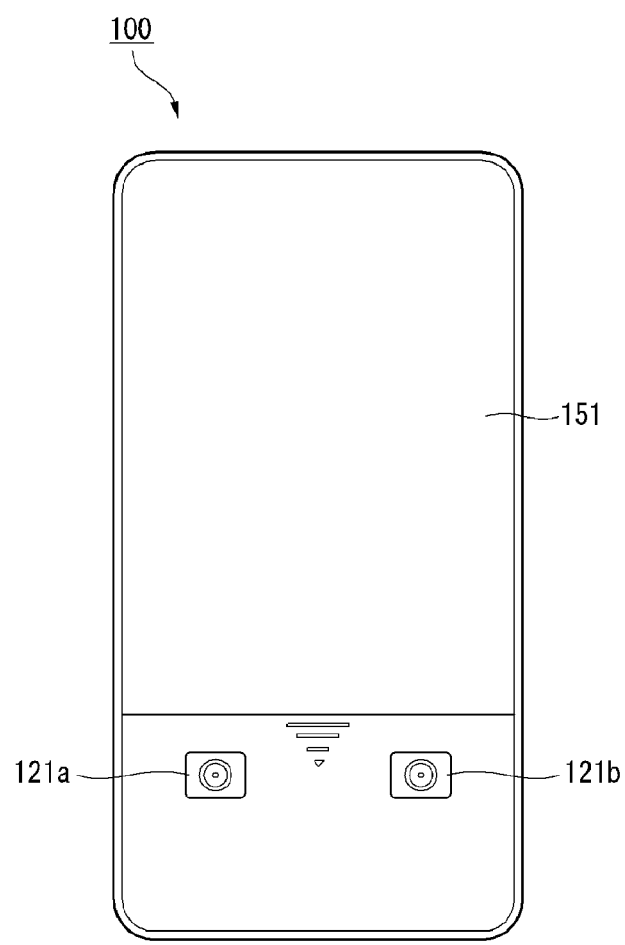
FIGS. 21 to 23 are views illustrating examples of obtaining a 2D image through a camera prioritized among a plurality of cameras.
Figure 22:
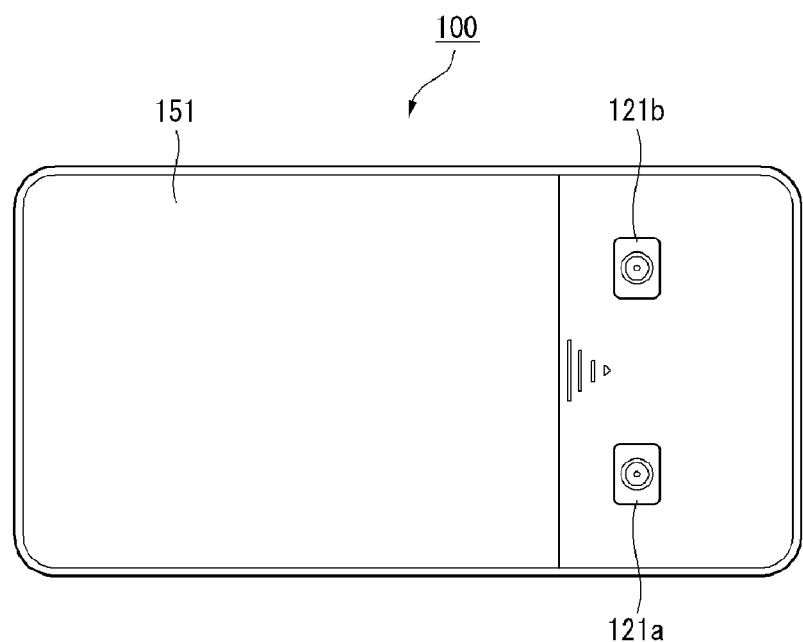
Figure 23:
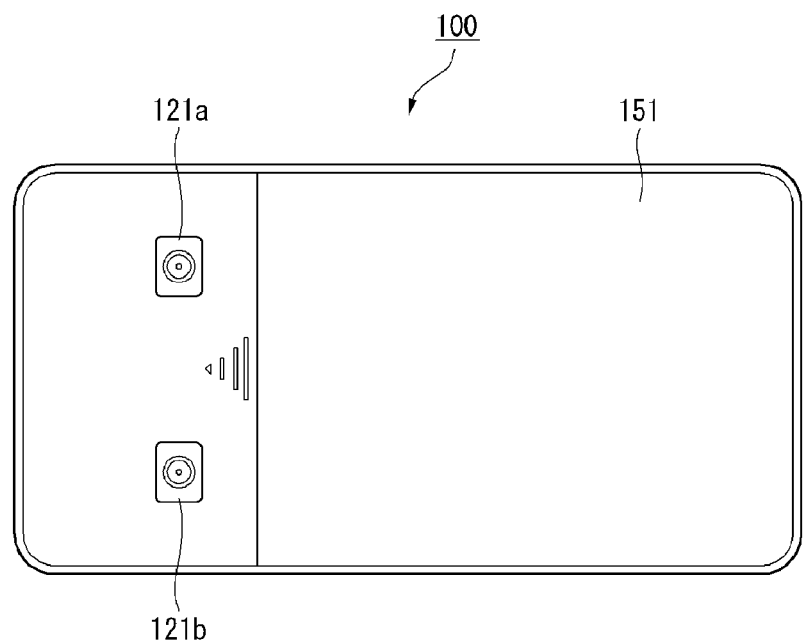

FIGS. 21 to 23 are views illustrating examples of obtaining a 2D image through a camera prioritized among a plurality of cameras.

For example, with reference to FIG. 21, the first camera 121*a* disposed at a left portion of the rear surface of the mobile terminal 100 is prioritized and a 2D image is desired to be obtained, the first camera 121*a* may be used. The priority may be changed to given to the second camera 121*b* disposed at a right portion of the rear surface of the mobile terminal 100.

Also, for example, when the user 100 is poised as illustrated in FIG. 23, the first camera 121*a* positioned at a relatively upper portion is given priority and a 2D image can be obtained through the first camera 121*a*.

Various exemplary embodiments disclosed in this document may be utilized or implemented in various applications supporting image displaying.

For example, the mobile terminal 100 may support a video call. As shown in FIGS. 6 and 8*b*, when the two cameras 121*a* and 121*b* are provided on the rear surface of the mobile terminal 100, the controller 180 may control the first and second cameras 121*a* and 121*b* to obtain left and right eye images and synthesize them to generate a stereoscopic image.

The controller 180 may display the generated stereoscopic image on the transparent display 151 and transmit the generated stereoscopic image to a counterpart for video call communication through the mobile communication module 112.

Also, for example, when the user is viewing a broadcast received through the broadcast receiving module 111 provided in the mobile terminal 100, the image included in the received broadcast may be a 2D image or a stereoscopic image.

When the broadcast image is a 2D image, the controller 180 may convert the 2D image into a 3D image and display the same on the transparent display 151. Also, when the broadcast image is a 3D image, the controller 180 may display the same on the transparent display 151.

Thus, the foregoing various exemplary embodiments may be applied in various applications and environments.

Figure 24:
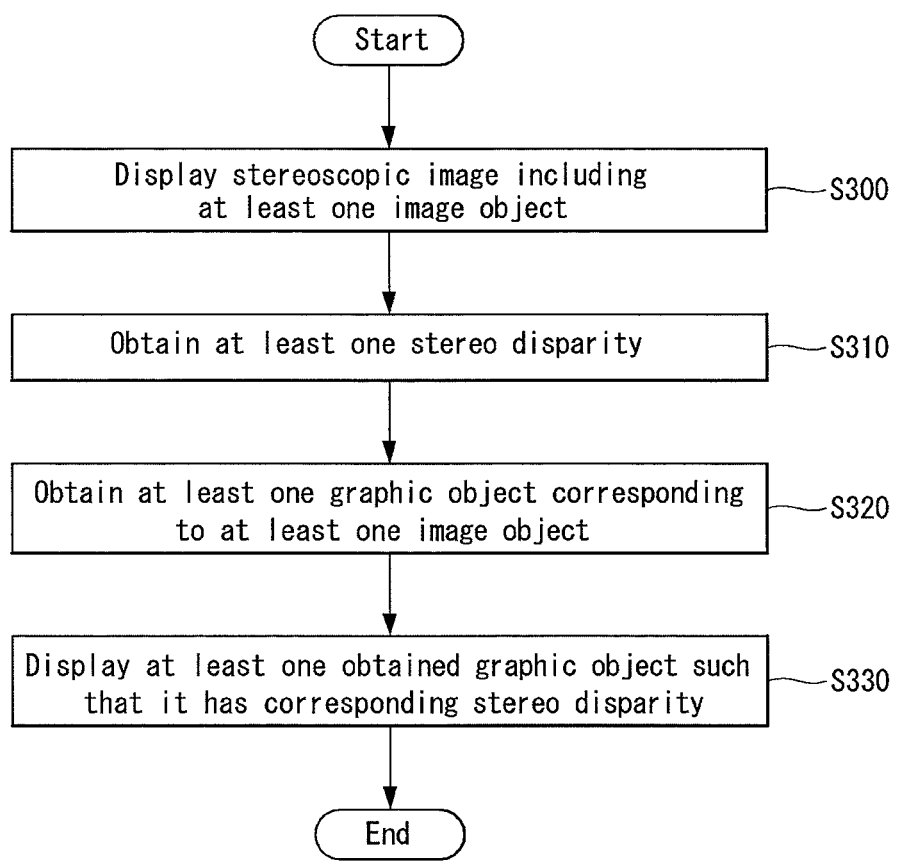
FIG. 24 is a flow chart illustrating the process of a method for displaying an image of a mobile terminal according to a third exemplary embodiment of the present invention.

FIG. 24 is a flow chart illustrating the process of a method for displaying an image of a mobile terminal according to a third exemplary embodiment of the present invention, and FIGS. 25 to 29 are views illustrating the method for displaying an image of a mobile terminal according to the third exemplary embodiment of the present invention.

A method for displaying an image of a mobile terminal according to the third exemplary embodiment of the present invention may be implemented in the mobile terminal 100 described above with reference to FIGS. 1 to 4. The method for displaying an image of a mobile terminal according to the third exemplary embodiment of the present invention and the mobile terminal 100 for implementing the same will now be described in detail with reference to the accompanying drawings.

With reference to FIG. 24, the controller 180 may display a stereoscopic image including at least one image object on the display unit 151 (S300).

Figure 25:
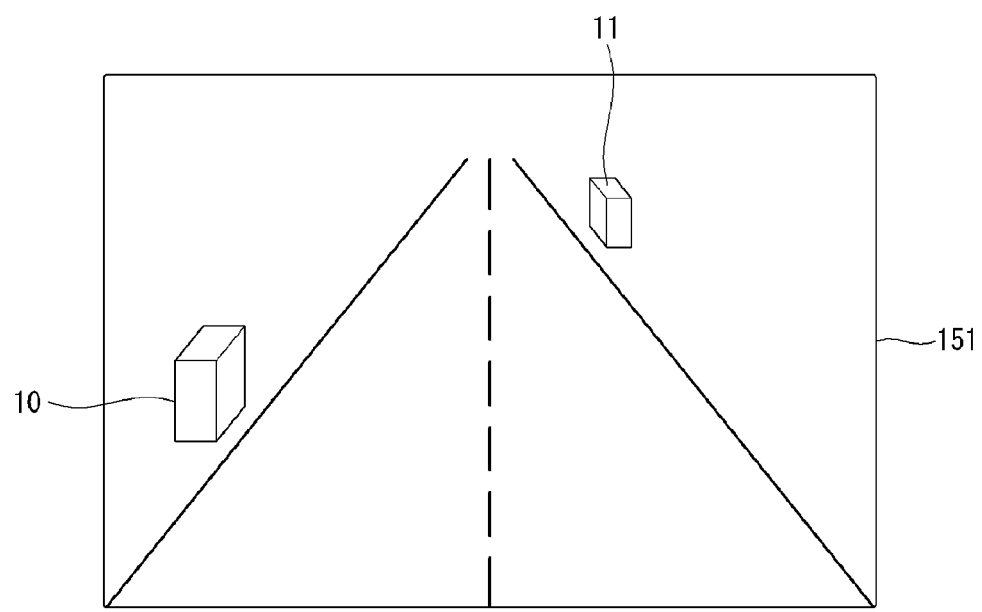
FIGS. 25 to 29 are views illustrating the method for displaying an image of a mobile terminal according to the third exemplary embodiment of the present invention.

FIG. 25 shows an example of displaying a stereoscopic image including a plurality of image objects 10 and 11.

For example, the stereoscopic image illustrated in FIG. 25 may be an image obtained through the camera 121. The stereoscopic image includes the first image object 10 and the second image object 11. Here, the two image objects 10 and 11 are supposed for the sake of brevity, but in actuality, more image objects may be included in the stereoscopic image.

The controller 180 may display an image, which is obtained in real time through the camera 121, in the form of a camera preview on the display unit 151.

The controller 180 may obtain at least one stereo disparity corresponding to at least one image object (S310).

When the camera 121 is a 3D camera capable of obtaining a left eye image and a right eye image, the controller 180 may obtain stereo disparities of the first image object 10 and the second image object 11 through the obtained left eye image and the right eye image.

Figure 26:
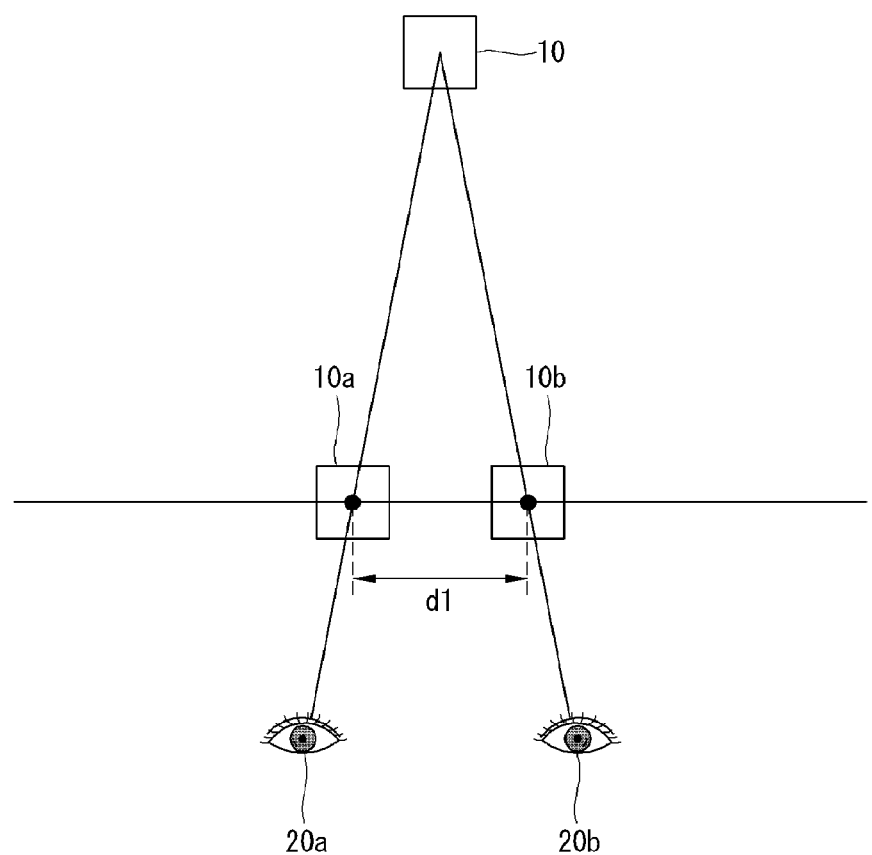

FIG. 26 is a view for explaining a stereo disparity of an image object included in a stereoscopic image.

For example, with reference to FIG. 26, the first image object 10 may include a left eye image 10a viewed by the user's left eye 20a and a right eye image 10b viewed by the user's right eye 10a.

The controller 180 may obtain a stereo disparity d1 corresponding to the first image object 10 through the left eye image 10a and the right eye image 10b.

Meanwhile, when the camera 121 is a 2D camera, the controller 180 may convert the 2D image obtained through the camera 121 into a stereoscopic image by using a certain algorithm for converting a 2D image into a 3D image, and display the converted stereoscopic image on the display unit 151.

Also, the controller may obtain a stereo disparity of the first image object 10 and that of the second image object 11, respectively, by using the left image and the right image generated by using the image conversion algorithm.

Figure 27:
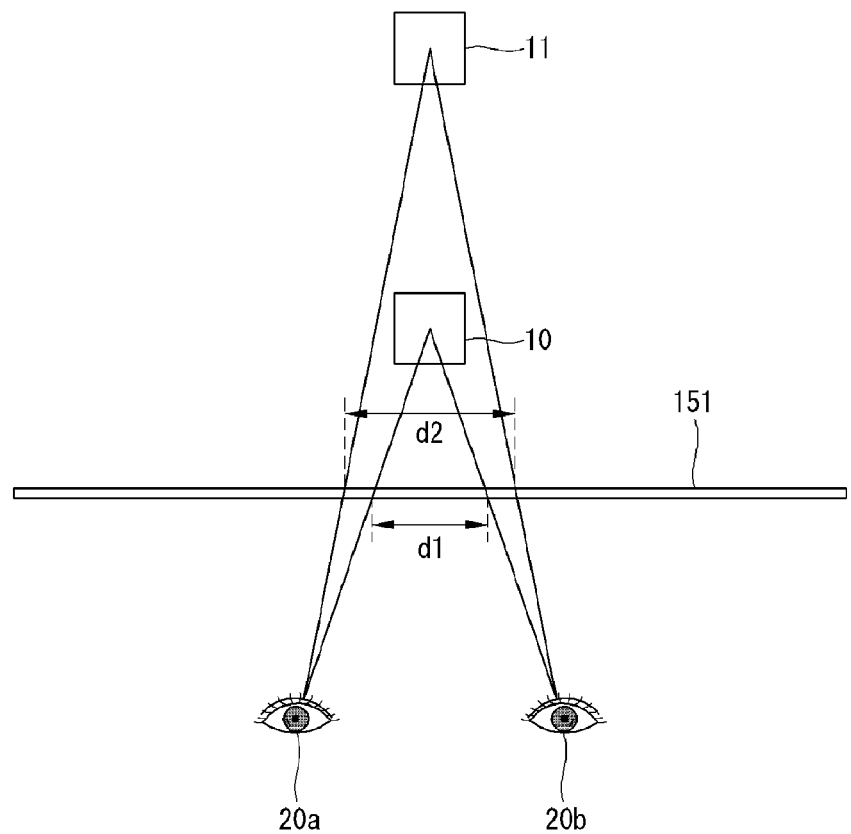

FIG. 27 illustrates the comparison between the stereo disparities of the image objects 10 and 11 illustrated in FIG. 25.

With reference to FIG. 27, the stereo disparity d1 of the first image object 10 and a stereo disparity d2 of the second image object 11 are different. Also, as shown in FIG. 27, because d2 is larger than d1, the second image object 11 is seen to be farther from the user than the first image object 10.

The controller 180 may obtain at least one graphic object corresponding to the at least one image object, respectively (S320). And, the controller 180 may display the at least one obtained graphic object on the display unit 151 such that it has a corresponding stereo disparity (S330).

Figure 28:
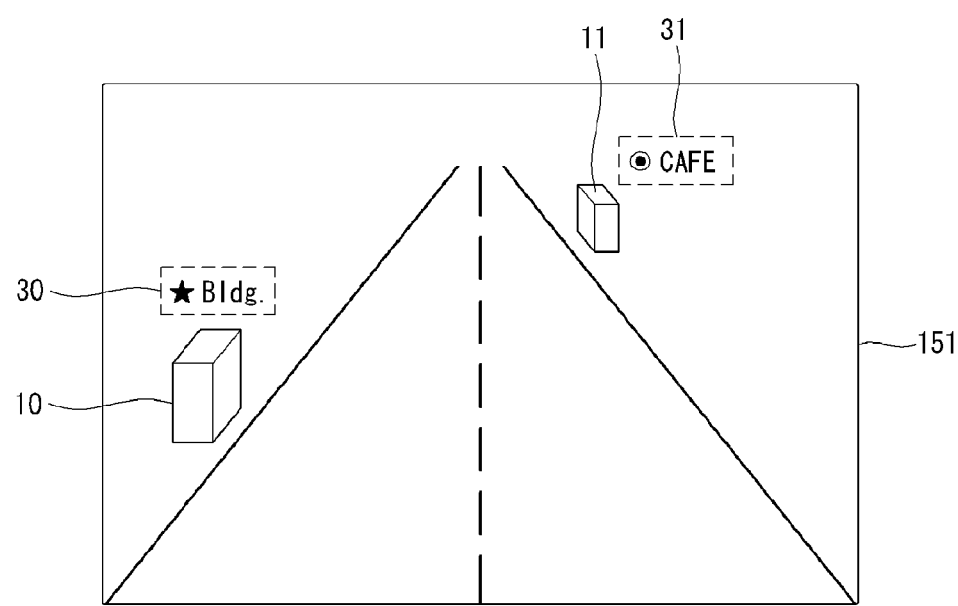

FIG. 28 illustrates an example of displaying graphic objects 30 and 31 corresponding to the image objects 10 and 11, respectively.

In FIG. 28, the first graphic object 30 includes text information describing the first image object 10, as information regarding the first image object 10. Also, the second graphic object 31 includes text information describing the second image object 11, as information regarding the second image object 11.

The controller 180 may receive various types of information regarding the at least one image object from the exterior or store the same in the memory 160 in advance.

FIG. 28 also illustrates an example of a screen providing a service called an augmented reality (AR).

Namely, the controller 180 obtains a current location of the mobile terminal 100 and an orientation direction of the mobile terminal 100, receive information regarding an object included in an external image input through the camera 121 based on the current location and the orientation direction of the mobile terminal 100 from an external source, and display the received information.

An AR service provides various types of information to the user by combining virtual information with an actual image and displaying the same. The AR itself is a known art, so a detailed description thereof will be omitted.

In FIG. 28, the stereoscopic image including the first and second image objects 10 and 11 correspond to a real image, and the first and second graphic objects 30 and as information describing the first and second image objects 10 and 11 correspond to virtual information.

In performing step S330, the controller 180 may generate the first and second graphic objects 30 and 31 as a stereoscopic image and display the same.

Here, in providing the first and second graphic images 30 and 31 as stereoscopic images, the controller 180 may make the stereo disparities of the first and second graphic images 30 and 31 identical to those of the first and second image objects 10 and 11.

Figure 29:
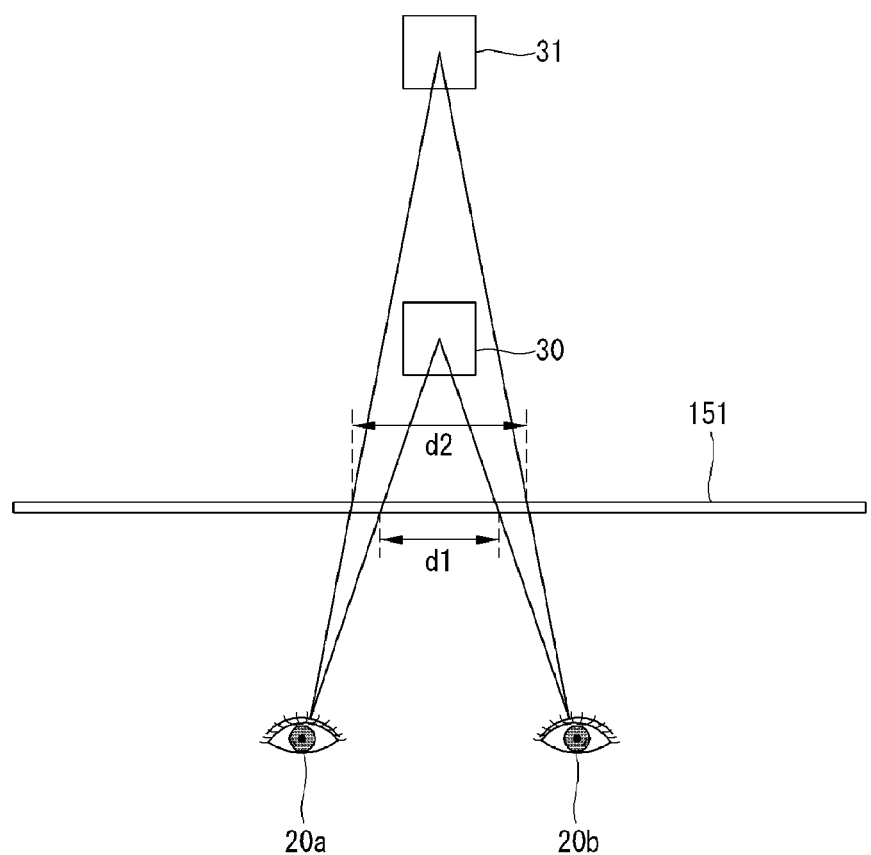

FIG. 29 is a view for explaining the stereo disparities of the first and second graphic images 30 and 31.

With reference to FIG. 29, the stereo disparity of the first graphic image 30 is d1, which is the same as the stereo disparity of the first image object 10, and the stereo disparity of the second graphic image 31 is d22, which is the same as the stereo disparity of the second image object 11.

Because the stereo disparity of the first image object 10 and that of the first graphic image 30 are identical, the user may feel that the first image object 10 and the first graphic image 30 have the same distance or the same depth through the display unit 151.

Figure 30:
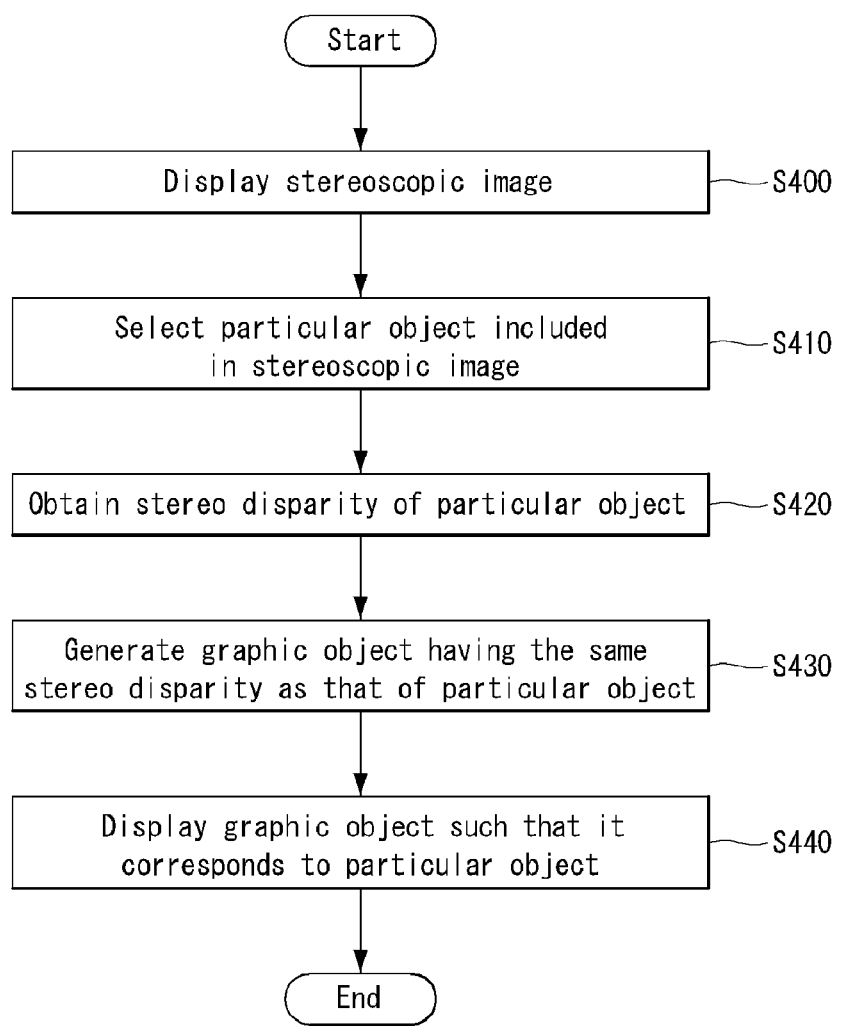
FIG. 30 is a flow chart illustrating the process of a method for displaying an image of a mobile terminal according to a fourth exemplary embodiment of the present invention.
Figure 31:
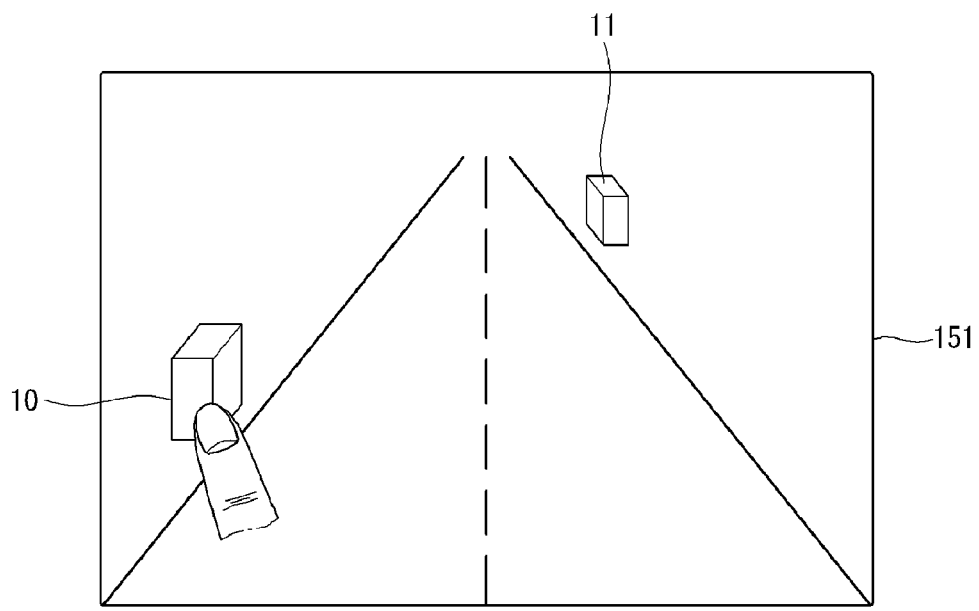
FIGS. 31 and 32 are views illustrating the method for displaying an image of a mobile terminal according to the fourth exemplary embodiment of the present invention.
Figure 32:
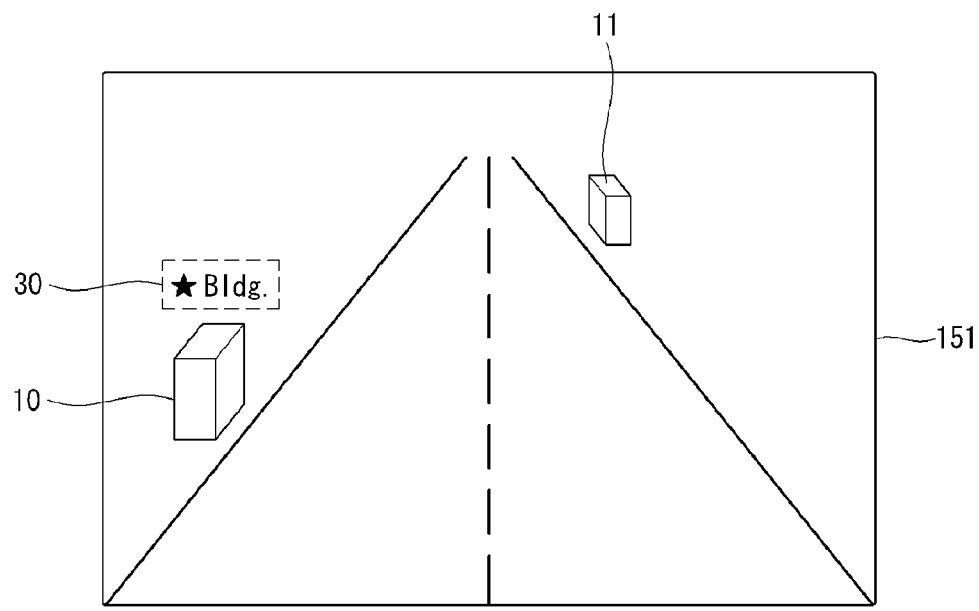

FIG. 30 is a flow chart illustrating the process of a method for displaying an image of a mobile terminal according to a fourth exemplary embodiment of the present invention, and FIGS. 31 and 32 are views illustrating the method for displaying an image of a mobile terminal according to the fourth exemplary embodiment of the present invention.

A method for displaying an image of a mobile terminal according to the fourth exemplary embodiment of the present invention may be implemented in the mobile terminal 100 described above with reference to FIGS. 1 to 4. The method for displaying an image of a mobile terminal according to the fourth exemplary embodiment of the present invention and the mobile terminal 100 for implementing the same will now be described in detail with reference to the accompanying drawings.

With reference to FIG. 30, the controller 180 may display a stereoscopic image on the display unit 151 (S400).

The stereoscopic image may be based on an image acquired in real time through the camera 121 or an image stored in the memory 160.

The controller 180 may receive a select signal with respect to a particular object included in the displayed stereoscopic image (S410).

FIG. 31 shows an example of performing steps S400 and S410.

With reference to FIG. 31, the user may touch the particular object 10 among the plurality of image objects 10 and 11 included in the stereoscopic image displayed on the display unit (151, here, it is regarded as a touch screen) to select the particular object 10.

The controller 180 may obtain a stereo disparity of the selected particular object 10 (S420).

For example, when the camera 121 is a 3D camera, the controller 180 may obtain a stereo disparity of the particular object 10 by using an image obtained through the 3D camera.

The controller 180 may generate a graphic object corresponding to the particular object 10, as a graphic object having the same stereo disparity as the obtained stereo disparity (S430).

Like the particular object 10, the graphic object is also a stereoscopic image having a left eye image and a right eye image.

The controller 180 may display the generated graphic object on the display unit 151 such that the generated graphic object corresponds to the particular object (S440).

FIG. 32 shows a screen displaying the graphic object 30 corresponding to the selected particular object 10 according to the user selection in FIG. 31.

Because the stereo disparity of the selected particular object 10 and that of the corresponding graphic object 30 are identical, the user may feel that the particular object 10 and the graphic object 30 are placed at the same distance from the mobile terminal 100.

Figure 33:
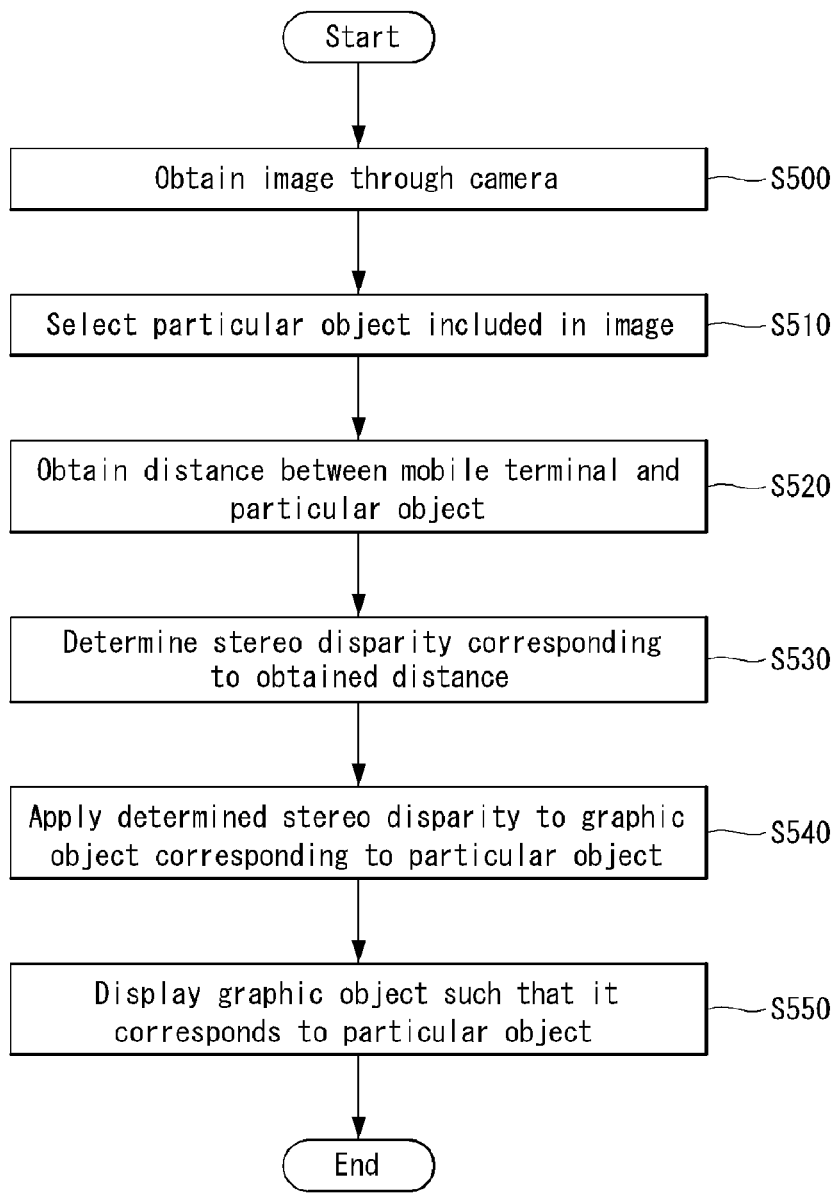
FIG. 33 is a flow chart illustrating the process of a method for displaying an image of a mobile terminal according to a fifth exemplary embodiment of the present invention.
Figure 34:
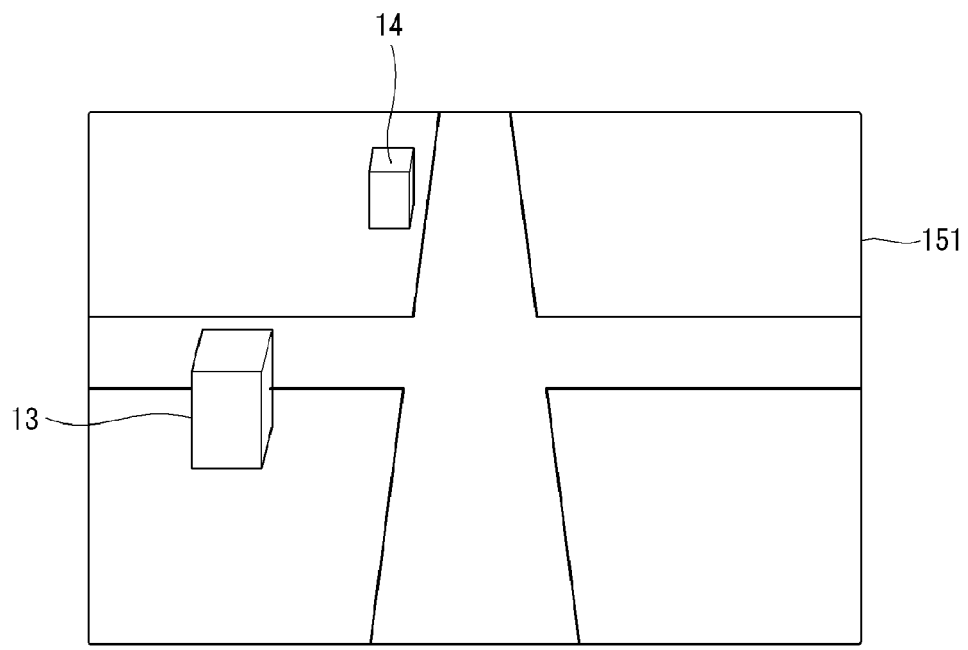
FIGS. 34 to 37 are views illustrating the method for displaying an image of a mobile terminal according to the fifth exemplary embodiment of the present invention.
Figure 37:
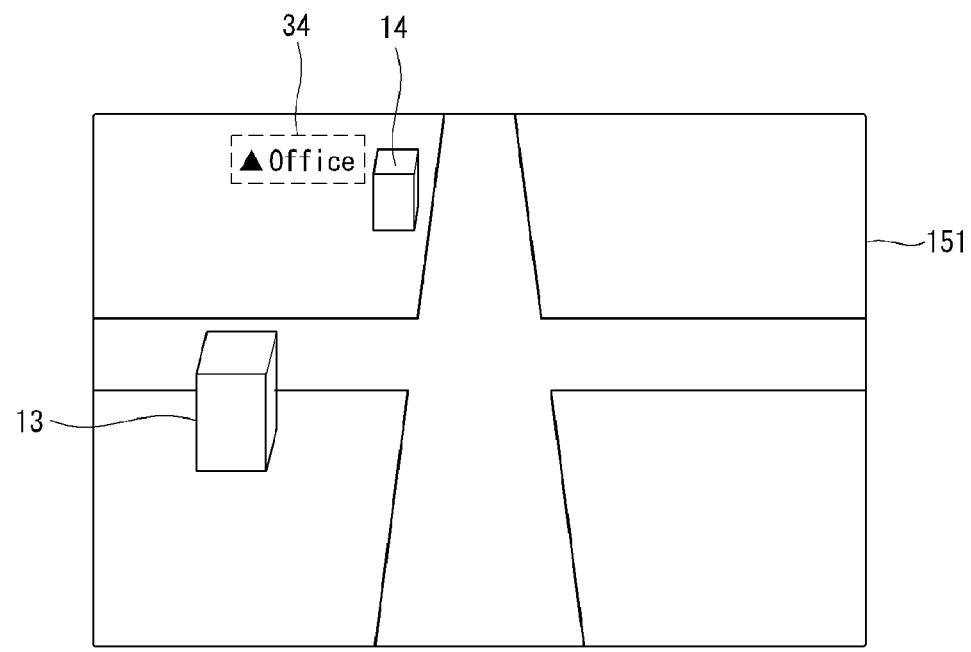

FIG. 33 is a flow chart illustrating the process of a method for displaying an image of a mobile terminal according to a fifth exemplary embodiment of the present invention, and FIGS. 34 and 37 are views illustrating the method for displaying an image of a mobile terminal according to the fifth exemplary embodiment of the present invention.

A method for displaying an image of a mobile terminal according to the fourth exemplary embodiment of the present invention may be implemented in the mobile terminal 100 described above with reference to FIGS. 1 to 4. The method for displaying an image of a mobile terminal according to the fourth exemplary embodiment of the present invention and the mobile terminal 100 for implementing the same will now be described in detail with reference to the accompanying drawings.

In the fifth exemplary embodiment of the present invention, it is assumed that the display unit 151 is a transparent display as described above.

With reference to FIG. 33, in a state in which the user can view objects on the opposite side through the transparent display 151, the controller 180 can obtain an image including the objects through the camera 121.

Here, the transparent display 151 may serve like glass.

FIG. 34 shows an example of performing step S500. In FIG. 34, reference numeral 151 denotes the transparent display, and various objects (e.g., reference numerals 13, 14, road, etc.) displayed on the transparent display 151 are objects viewed through the transparent display.

Figure 35:
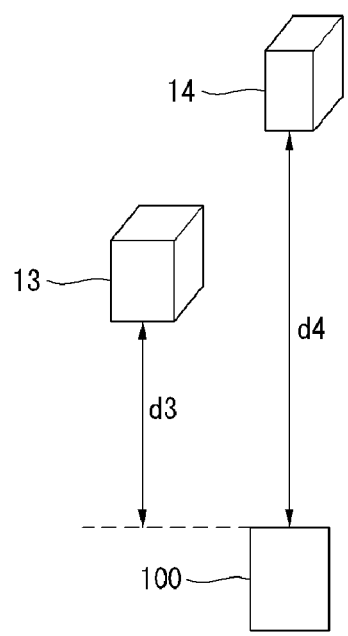

FIG. 35 is a view for explaining the distance between the first object 13 and the second object 14 and the mobile terminal 100.

As shown in FIG. 35, the first object 13 is away by a distance d3 from the mobile terminal 100, and the second object 14 is away by a distance d4 from the mobile terminal 100. The distance d3 is smaller than the distance d4.

The controller 180 may receive a select signal with respect to a particular object among the plurality of objects viewed through the transparent display 151 (S510).

For example, when the transparent display 151 is a touch screen and the user touches the surface of the transparent display with his finger, the controller 180 may elect an object (e.g., the first object 13 or the second object 14) displayed at the touched point.

To this end, the controller 180 may use a camera image obtained in step S500.

For example, the controller 180 may match the camera image and the transparent display 151 and determine to which of objects included in the camera image the user's touch point corresponds.

Figure 36:
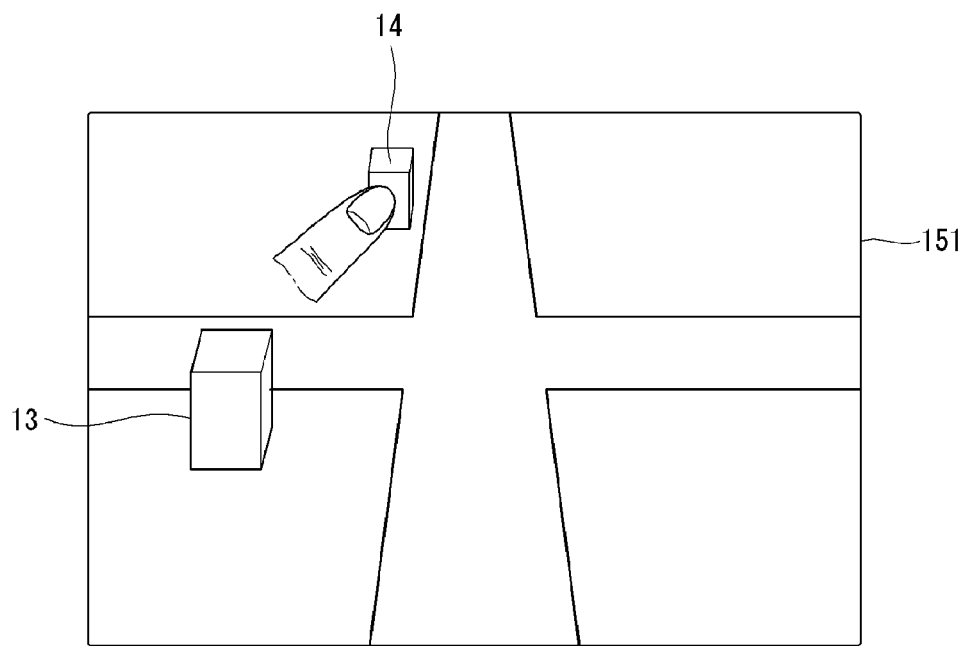

FIG. 36 shows an example of performing step S510. As shown in FIG. 36, when the user touches a point where the second object 14 is viewed with his finger, the controller 180 may select the second object 14.

The controller 180 may obtain the distance information d4 between the mobile terminal 100 and the position where the selected second object 14 exists actually (S520).

The distance information d4 may be obtained in various manners.

For example, when the camera 121 is a 3D camera, as discussed above, the camera can obtain the distance information d4 by using a stereo disparity.

The controller 180 may control the location information unit 115 to obtain a current location of the mobile terminal 100 and recognize the position of the selected second object 14 by using the map. Also, it may be recognized that the difference between the obtained current location and the position of the second object 14 corresponds to the distance d4.

Also, for example, the controller 180 may obtain the distance d4 to the second object by using a focal length of the camera 121. For example, the controller 121 may determine a focal length having the best sharpness of the second object, as the distance d4.

The controller 180 may determine a stereo disparity corresponding to the obtained distance d4 (S530).

In performing the step S530, the controller 180 may use a table in which the distance and the stereo disparity are matched.

The table may be stored in the memory 160. The table is a database in which a particular distance and a particular stereo disparity are matched, which can be used as a reference or a tool for applying different stereo disparities to different objects.

The controller may apply the determined stereo disparity to a graphic object corresponding to the selected particular object (here, the second object 14) (S540), and display the graphic object having the determined stereo disparity as a stereoscopic image such that it corresponds to the particular object (S550).

Likewise as in the second and fifth exemplary embodiment of the present invention as described above, the graphic object corresponding to the particular object may include information regarding the particular object (e.g., information describing the particular object).

FIG. 37 shows an example of a displayed screen in which the graphic object, to which the same stereo disparity as that of the second object 14 selected in FIG. 36 is applied, corresponds to the second object 14.

Figure 38:
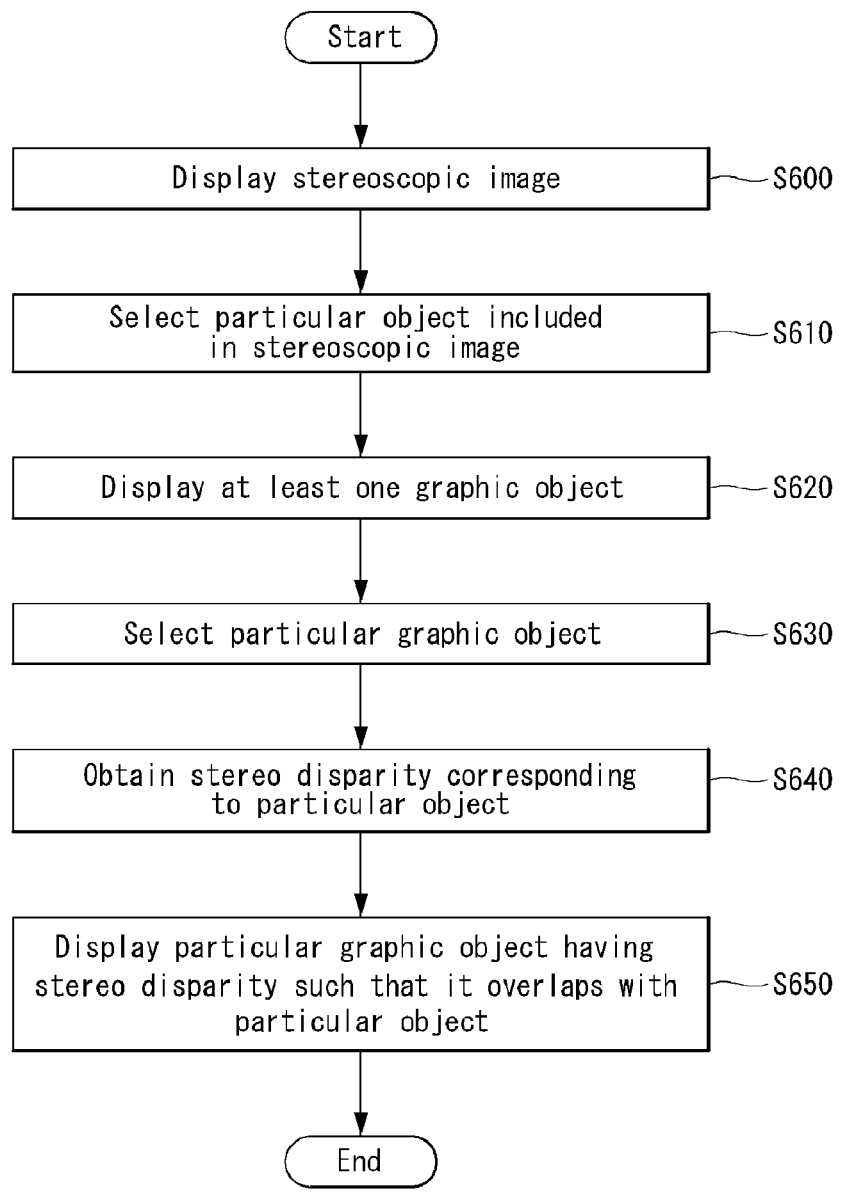
FIG. 38 is a flow chart illustrating the process of a method for displaying an image of a mobile terminal according to a sixth exemplary embodiment of the present invention.
Figure 39:
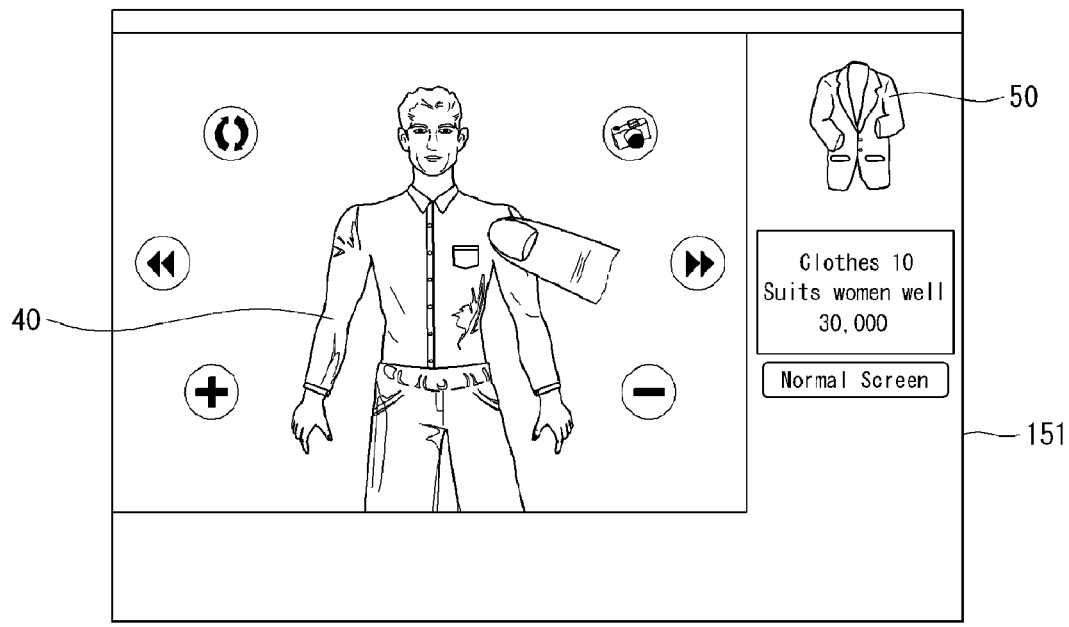
FIGS. 39 to 41 are views illustrating the method for displaying an image of a mobile terminal according to the sixth exemplary embodiment of the present invention.
Figure 41:
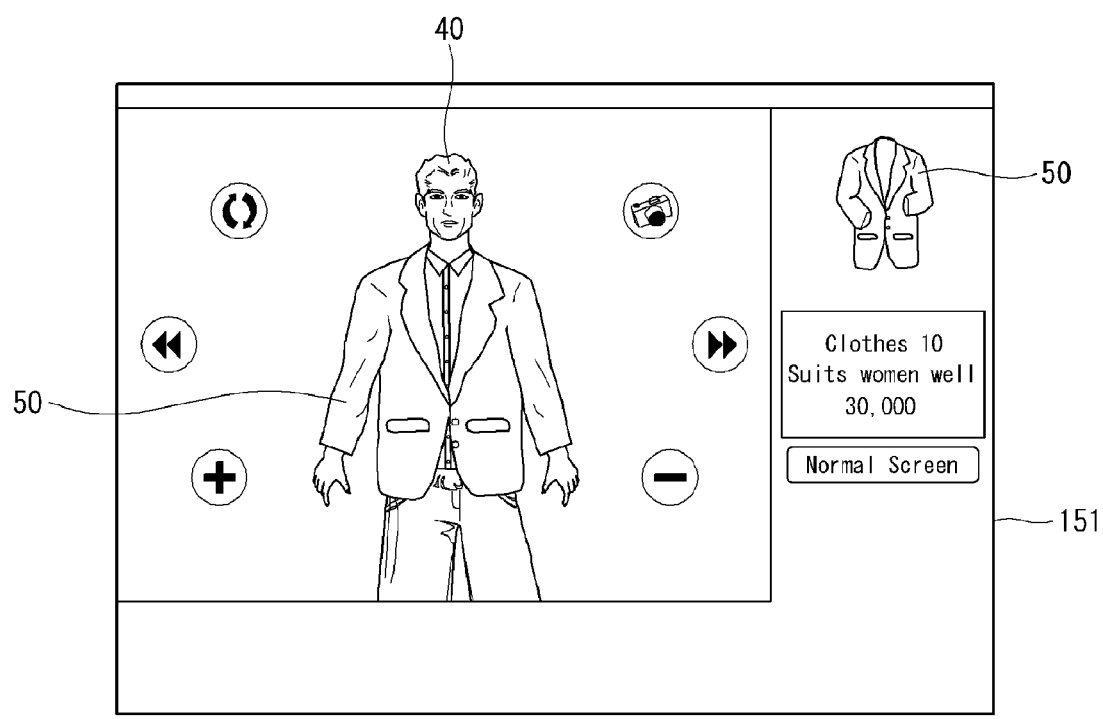

FIG. 38 is a flow chart illustrating the process of a method for displaying an image of a mobile terminal according to a sixth exemplary embodiment of the present invention, and FIGS. 39 and 41 are views illustrating the method for displaying an image of a mobile terminal according to the sixth exemplary embodiment of the present invention.

A method for displaying an image of a mobile terminal according to the sixth exemplary embodiment of the present invention may be implemented in the mobile terminal 100 described above with reference to FIGS. 1 to 4. The method for displaying an image of a mobile terminal according to the fourth exemplary embodiment of the present invention and the mobile terminal 100 for implementing the same will now be described in detail with reference to the accompanying drawings.

With reference to FIG. 38, the controller 180 may display a stereoscopic image on the display unit 151 (S600).

The stereoscopic image may be based on an image obtained through the camera 121. This is the same as that described above in the foregoing exemplary embodiments.

The controller 180 may select a particular object included in the stereoscopic image (S610).

And then, the controller 180 may display at least one graphic object on the display unit 151 according to the performing of the step S610 or when the stereoscopic image is displayed in step S600 (S620).

FIG. 39 shows an example of performing steps S600 to S620.

As shown in FIG. 39, the controller 180 may receive a select signal with respect to a particular object 40 included in the stereoscopic image. Here, it is assumed that the display unit 151 is a touch screen. As shown in FIG. 39, the particular object 40 may be a person.

The controller 180 may display the at least one graphic object 50 on the stereoscopic image or in the vicinity of the stereoscopic image.

The controller 180 may receive a select signal with respect to a particular graphic object among the at least one graphic object 50 (S630).

Figure 40:
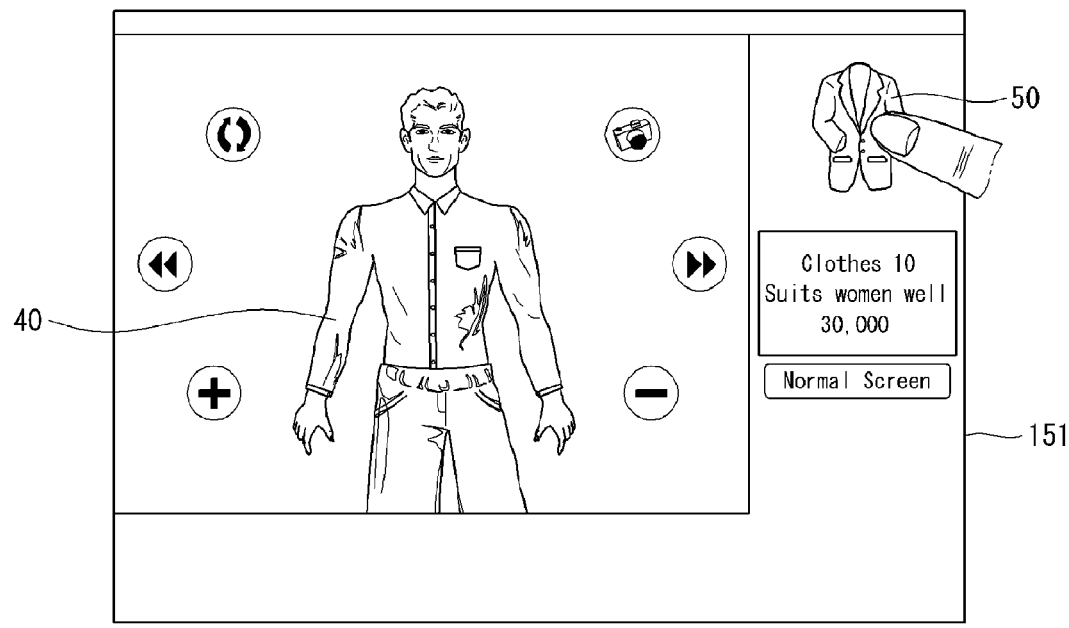

FIG. 40 shows an example of performing step S630. For example, the user may touch the particular graphic object 50 with his finger to select the particular graphic object 50.

The controller 180 may obtain a stereo disparity corresponding to the particular object 40 (S640). The stereo disparity may be obtained according to the method as described above in the first to fifth exemplary embodiments.

The controller 180 makes the particular graphic object 50 a stereoscopic image such that the particular graphic object 50 has the obtained stereo disparity, and display the particular graphic object 50 as a stereoscopic image such that it overlaps with the particular object 40 (S650).

FIG. 41 shows an example of performing step S650. As shown in FIG. 41, a virtual graphic image is seen to overlap with an entity (here, the particular object 40) by performing steps S600 to S650, and in this case, the entity and the virtual graphic image may be seen to be placed at the same distance from the mobile terminal 100.

FIGS. 39 to 41 are diagraphs showing a scenario in which a person (the entity) is virtually dressed in clothes (the virtual graphic image).

In the foregoing exemplary embodiments, the entirety of the stereoscopic image displayed on the display unit 151 or a depth level of a particular object included in the stereoscopic image may be changed.

For example, as the depth level of the stereoscopic image is deeper, it means that an object seen to be farther is seen to be farther to the user. Also, for example, as the depth level of the stereoscopic image is thinner, it means that an object seen to be farther is seen to be closer to the user.

In order to change the depth level of the stereoscopic image or the particular object, a corresponding stereo disparity must be changed.

When the depth level of the entirety of the stereoscopic image or the particular object included in the stereoscopic image is changed, the depth level of the graphic object displayed correspondingly according to the particular object can also be changed.

To this end, the controller 180 may change the stereo disparity of the graphic object such that it the same as the changed stereo disparity of the particular object.

The method for providing information of the mobile terminal according to exemplary embodiments of the present invention may be recorded in a computer-readable recording medium as a program to be executed in the computer and provided.

The method for providing information of the mobile terminal according to exemplary embodiments of the present invention may be executed by software. When executed by software, the elements of the exemplary embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD±ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a transparent display having a panel for implementing a stereoscopic vision on at least one of both surfaces thereof;
    a sensing unit configured to sense a surface that faces a user, among the both surfaces, and a pose of the mobile terminal;
    a plurality of cameras configured to obtain an external image; and
    a controller configured to:
    activate a camera prioritized among the plurality of cameras based on the pose of the mobile terminal;
    obtain a two-dimensional (2D) image through the activated camera;
    convert the 2D image into a three-dimensional (3D) image;
    output the 3D image as a stereoscopic image on the panel corresponding to the surface that faces the user and the 2D image on a reverse panel; and
    reverse horizontally or vertically the 2D image and the 3D image being displayed on the panel and reverse panel when a change in the surface facing the user is detected, wherein the controller is further configured to change the activated camera to another camera among the plurality of cameras and to activate the another camera when the pose of the mobile terminal is changed.

2. The mobile terminal of claim 1, wherein the sensing unit further senses a rotational direction of the mobile terminal, and when the surface facing the user is changed, the controller is configured to detect a rotational direction of the mobile terminal through the sensing unit, and when the rotational direction is a horizontal direction, the controller is configured to horizontally reverse the displayed image, and when the rotational direction is a vertical direction, the controller is configured to vertically reverse the displayed image.

3. The mobile terminal of claim 1, wherein when the panel is provided on both surfaces, the panel provided on one of the both surfaces has a structure for implementing a stereoscopic vision in a vertical direction, and the other has a structure for implementing a stereoscopic vision in a horizontal direction.

4. The mobile terminal of claim 3, wherein the controller is configured to output the stereoscopic image such that it corresponds with the structure of the panel provided on the surface facing the user among the structure for implementing the stereoscopic vision in the vertical direction and the structure for implementing the stereoscopic vision in the horizontal direction.

5. The mobile terminal of claim 1, wherein the panel according to a parallax barrier scheme has a structure for implementing both stereoscopic vision in the vertical direction and stereoscopic vision in the horizontal direction, and the controller is configured to control the panel in the parallax barrier scheme such that the stereoscopic vision in the vertical direction or the stereoscopic vision in the horizontal direction can be implemented according to the pose of the mobile terminal.

6. The mobile terminal of claim 5, wherein the controller is configured to output the stereoscopic image such that it corresponds with the implementation of the stereoscopic vision in the vertical direction or the stereoscopic vision in the horizontal direction determined according to the pose of the mobile terminal.

7. The mobile terminal of claim 1, wherein the controller is configured to synthesize a left eye image and a right eye image obtained through the plurality of cameras to generate the stereoscopic image.

8. The mobile terminal of claim 1, wherein the sensing unit senses the surface facing the user by using any one of an acceleration sensor, an optical sensor, a temperature sensor, and a touch sensor.

9. The mobile terminal of claim 1, wherein the mobile terminal is configured as a single body in which an area including the transparent display and an area including a circuit for implementing the controller are physically discriminated.

10. The mobile terminal of claim 1, wherein the mobile terminal comprises a first body on which the transparent display is mounted and a second body on which a circuit for implementing the controller is mounted, and the first and second bodies are coupled to be foldable or slidable with each other.

11. A method for displaying an image of a mobile terminal, the method comprising:
displaying an image on a transparent display having a panel for implementing a stereoscopic vision on at least one of both surfaces thereof;
detecting a change in a surface that faces a user among the both surfaces and a pose of the mobile terminal;
activating a camera prioritized among a plurality of cameras on the mobile terminal based on the pose of the mobile terminal;
obtaining a 2D image through the activated camera;
converting the 2D image into a 3D image;
outputting the 3D image as a stereoscopic image on the panel corresponding to the surface that faces the user and the 2D image on a reverse panel;
reversing the 2D and 3D images on the panel and reverse panel horizontally or vertically according to the detected change; and
changing the activated camera to another camera among the plurality of cameras and activating the another camera when the pose of the mobile terminal is changed.

12. The method of claim 11, further comprising:
detecting a rotational direction of the mobile terminal when the surface facing the user is changed,
wherein, in reversing the displayed image horizontally or vertically, when the detected rotational direction is a horizontal direction, the displayed image is horizontally reversed, and when detected rotational direction is a vertical direction, the displayed image is vertically reversed.

13. The method of claim 11, wherein the panel has a structure for implementing a stereoscopic vision according to any one of a lenticular lens scheme and a parallax barrier scheme.

* * * * *